US008421862B2

(12) United States Patent
Yago et al.

(10) Patent No.: US 8,421,862 B2
(45) Date of Patent: Apr. 16, 2013

(54) DRIVE RECORDER

(75) Inventors: Mariko Yago, Kobe (JP); Atsushi Ishimizu, Kobe (JP); Fujio Tonokawa, Kobe (JP); Ryuichi Morimoto, Kobe (JP); Munenori Maeda, Kobe (JP); Tetsuya Uetani, Kobe (JP); Masahiro Motojima, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 435 days.

(21) Appl. No.: 12/669,299

(22) PCT Filed: Sep. 26, 2008

(86) PCT No.: PCT/JP2008/067974

§ 371 (c)(1), (2), (4) Date: Jan. 15, 2010

(87) PCT Pub. No.: WO2009/041718

PCT Pub. Date: Apr. 2, 2009

(65) Prior Publication Data

US 2010/0171829 A1 Jul. 8, 2010

(30) Foreign Application Priority Data

Sep. 28, 2007 (JP) ................................ 2007-255721
Sep. 28, 2007 (JP) ................................ 2007-255767

(51) Int. Cl.
*H04N 7/04* (2006.01)
*H04N 7/18* (2006.01)
*B60R 25/10* (2006.01)

(52) U.S. Cl.
USPC ......................... 348/148; 348/143; 340/426.1

(58) Field of Classification Search ........................ None
See application file for complete search history.

(56) References Cited

U.S. PATENT DOCUMENTS 6,389,340 B1 * 5/2002 Rayner ............................ 701/35
7,266,433 B2 * 9/2007 Ozawa et al. .................... 701/35
(Continued)

FOREIGN PATENT DOCUMENTS

JP 63-016785 1/1988
JP S63-16785 1/1988
(Continued)

OTHER PUBLICATIONS

Office action issued in corresponding Japanese application No. 2009-234212, issued on Aug. 17, 2011, 9pp.

(Continued)

*Primary Examiner* — Mohamed Ibrahim
*Assistant Examiner* — Joiya M Cloud
(74) *Attorney, Agent, or Firm* — Christie, Parker & Hale, LLP.

(57) ABSTRACT

A drive recorder for recording video information received from an image capturing unit on a recording medium includes an acceleration sensor which outputs acceleration information representing an acceleration applied to a vehicle, and a control unit which, determines that a recording condition holds and records video information captured for a first predetermined period of time before the occurrence of the recording condition and video information captured for a second predetermined period of time after the occurrence of the recording condition on the recording medium when the acceleration information equals or exceeds a threshold, wherein after the recording condition holds, the control unit does not record newly captured video information on the recording medium when the acceleration information again becomes equal to or exceeds the threshold in less than a third predetermined period of time which is shorter than the second predetermined period of time.

3 Claims, 33 Drawing Sheets

U.S. PATENT DOCUMENTS

2003/0168839 A1* 9/2003 Miyoshi ........................ 280/735
2006/0192658 A1* 8/2006 Yamamura ................. 340/425.5
2007/0040365 A1* 2/2007 Asada ........................... 280/735
2007/0109106 A1* 5/2007 Maeda et al. .............. 340/426.1
2007/0285512 A1* 12/2007 Kitani et al. .................. 348/148
2008/0059054 A1* 3/2008 Yamada ........................ 701/200
2010/0100276 A1* 4/2010 Fujinawa et al. ............... 701/33

FOREIGN PATENT DOCUMENTS

JP 06-186061 7/1994
JP H06-186061 7/1994
JP 06-237463 8/1994
JP H06-237463 8/1994
JP 06-331391 12/1994
JP H06-331391 12/1994
JP 7-249137 9/1995
JP 9-50547 2/1997
JP 10-29567 2/1998
JP 2006-235732 9/2006
JP 2009-87011 4/2009
WO WO 2007/066613 A1 6/2007

OTHER PUBLICATIONS

International Search Report, dated Dec. 22, 2008, corresponding to PCT/JP2008/067974.
Office action dated Mar. 31, 2009 cited in corresponding Japanese Application No. 2007-255767, including English Translation; 7pp.
Office action dated Mar. 31, 2009 cited in corresponding Japanese Application No. 2007-255721; including English Translation; 5pp.

* cited by examiner

| SPEED | NOT CORRECTED FOR ELDERLY | | CORRECTED FOR ELDERLY | |
|---|---|---|---|---|
| | HORIZONTAL | VERTICAL | HORIZONTAL | VERTICAL |
| 0~20 | 200 | 112 | 160 | 90 |
| 21~40 | 140 | 78 | 112 | 63 |
| 41~60 | 100 | 56 | 80 | 45 |
| 61~80 | 70 | 39 | 56 | 31 |
| 81~100 | 50 | 28 | 40 | 22 |
| 101~120 | 40 | 22 | 32 | 18 |
| 121~ | 35 | 19 | 28 | 15 |

Fig. 28

| DRIVING SITUATION | G2 VALUE (TRANSVERSE) | | | | G1 VALUE (LONGITUDINAL) | | | | VEHICLE SPEED | | | |
|---|---|---|---|---|---|---|---|---|---|---|---|---|
| | BEFORE DETECTION | | AFTER DETECTION | | BEFORE DETECTION | | AFTER DETECTION | | BEFORE DETECTION | | AFTER DETECTION | |
| | LOWER LIMIT | UPPER LIMIT | LOWER LIMIT | UPPER LIMIT | LOWER LIMIT | UPPER LIMIT | LOWER LIMIT | UPPER LIMIT | LOWER LIMIT | UPPER LIMIT | LOWER LIMIT | UPPER LIMIT |
| ABRUPT STARTING | 0.0 | 0.0 | 0.0 | 0.0 | -2.0 | -0.2 | 0.0 | 0.0 | 0.0 | 0.0 | 0.0 | 0.0 |
| HARD BRAKING | 0.0 | 0.0 | 0.0 | 0.0 | 0.5 | 3.0 | -3.0 | -0.4 | 0.0 | 0.0 | 0.0 | 0.0 |
| NORMAL BRAKING | 0.0 | 0.0 | 0.0 | 0.0 | 0.05 | 0.5 | -0.5 | -0.05 | 0.0 | 0.0 | 0.0 | 0.0 |
| ABRUPT LEFT TURN STEERING | 0.1 | 2.0 | 0.0 | 0.0 | 0.0 | 0.0 | 0.0 | 0.0 | 0.0 | 0.0 | 0.0 | 0.0 |
| ABRUPT RIGHT TURN STEERING | -2.0 | -0.1 | 0.0 | 0.0 | 0.0 | 0.0 | 0.0 | 0.0 | 0.0 | 0.0 | 0.0 | 0.0 |

DRIVE RECORDER

CROSS-REFERENCE TO RELATED APPLICATION

This application is a National Phase Patent Application and claims the priority of International Application Number PCT/JP2008/067974, filed on Sep. 26, 2008, which claims priority of Japanese Patent Application Number 2007-255721, filed on Sep. 28, 2007, and Japanese Patent Application Number 2007-255767, filed on Sep. 8, 2007.

FIELD OF THE INVENTION

The present invention relates to a drive recorder, and more particularly to a drive recorder that records video information by detecting acceleration using an acceleration sensor.

BACKGROUND OF THE INVENTION

In the prior art, a vehicle-mounted video recording apparatus has been proposed, generally known as a vehicle drive recorder, that captures the view outside of a vehicle by a camera mounted on the vehicle and records the captured view along with vehicle speed upon detecting an impact to the vehicle, such as a collision, hard braking, etc. When such a drive recorder is mounted in a vehicle, it is possible, in the event of a vehicle accident, to investigate the cause of the accident by analyzing the recorded information. Furthermore, not only does the drive recorder serve to enhance the driver's awareness of safe driving, but also records the driver's usual driving habits, for example, for safe driving guidance.

Patent documents 1 and 2 each disclose a drive recorder in which the video being captured by an onboard camera is recorded in a continuously looping fashion, and in the event of an accident, the recorded video is saved on another recording medium. Further, patent documents 3 and 4 each disclose a drive recorder in which vehicle driving data, such as vehicle speed and transmission gear position, is recorded in a continuously looping fashion, and in the event of an accident, the recorded driving data is saved on another recording medium.

Patent document 1: Japanese Unexamined Patent Publication No. S63-16785

Patent document 2: Japanese Unexamined Patent Publication No. H06-237463

Patent document 3: Japanese Unexamined Patent Publication No. H06-331391

Patent document 4: Japanese Unexamined Patent Publication No. H06-186061

SUMMARY OF THE INVENTION

When detecting acceleration being applied to a vehicle by using an acceleration sensor incorporated in the drive recorder, the acceleration sensor can detect high acceleration values repetitively, such as when the driver applies hard braking repetitively or when the vehicle has collided with an obstacle immediately after hard braking.

Generally, in the drive recorder, if the acceleration information from the acceleration sensor equals or exceeds a threshold, it is determined that the recording condition holds, and video information captured for a predetermined period of time before and after the occurrence of the recording condition is recorded on a recording medium; in this case, if the acceleration information from the acceleration sensor exceeds the threshold repetitively, video information captured for the predetermined period of time before and after the occurrence of the recording condition will be recorded on the recording medium each time the recording condition holds.

That is, if acceleration information equal to or greater than the threshold is detected repetitively within a short period of time, there is the possibility that the same video information may be recorded in an overlapping fashion repetitively on the recording medium having a limited capacity.

Accordingly, it is an object of the present invention to provide a drive recorder that can record all video information required and only what is required.

Further, when detecting acceleration by using an acceleration sensor, if the acceleration sensor malfunctions, the acceleration sensor can continue to output acceleration information equal to or greater than the predetermined value. Further, in such cases as when the vehicle has rolled over due to hard braking, the acceleration sensor can also continue to output acceleration information equal to or greater than the predetermined value.

In the drive recorder, if provisions are made to record the video information by determining that the recording condition holds whenever the acceleration information from the acceleration sensor becomes equal to or exceeds the predetermined value, then if, in such cases, the acceleration sensor continues to output acceleration information equal to or greater than the predetermined value, video information that need not necessarily be recorded will continue to be recorded on the recording medium.

Accordingly, it is an object of the present invention to provide a drive recorder that can record all video information required and only what is required, by determining that the recording condition holds only when the acceleration applied to the vehicle is properly detected.

There is provided a drive recorder for recording video information received from an image capturing unit onto a recording medium, includes an acceleration sensor which outputs acceleration information representing an acceleration applied to a vehicle, and a control unit which determines that a recording condition holds and records video information captured for a first predetermined period of time before the occurrence of the recording condition and video information captured for a second predetermined period of time after the occurrence of the recording condition on the recording medium when the acceleration information equals or exceeds a threshold, wherein after the recording condition once holds, the control unit does not records newly captured video information on the recording medium when the acceleration information again becomes equal to or exceeds the threshold in less than a third predetermined period of time which is shorter than the second predetermined period of time.

There is also provided a drive recorder for recording video information received from an image capturing unit onto a recording medium, includes an acceleration sensor which outputs acceleration information representing an acceleration applied to a vehicle, and a control unit which determines that a recording condition holds and records video information captured for a first predetermined period of time before the occurrence of the recording condition and video information captured for a second predetermined period of time after the occurrence of the recording condition on the recording medium when the acceleration information equals or exceeds a threshold, wherein after the recording condition holds, the control unit does not record newly captured video information on the recording medium when the acceleration information again becomes equal to or exceeds the threshold within the second predetermined period of time, and records newly captured video information on the recording medium when the recording condition again holds after the second predetermined period of time has elapsed.

There is also provided a drive recorder for recording video information received from an image capturing unit onto a recording medium, includes an acceleration sensor which outputs acceleration information representing an acceleration applied to a vehicle, and a control unit which determines that a recording condition holds and records video information captured for a first predetermined period of time before the occurrence of the recording condition and video information captured for a second predetermined period of time after the occurrence of the recording condition on the recording medium when the acceleration information equals or exceeds a threshold, wherein after the recording condition holds, the control unit continues the recording of the video information on the recording medium even after the second predetermined period of time has elapsed when the acceleration information again becomes equal to or exceeds the threshold within the second predetermined period of time.

According to the drive recorder of the present invention, when the acceleration information again becomes equal to or exceeds the threshold within a relatively short period of time, newly captured video information is not transferred for recording on the recording medium, thus preventing the same video information from being recorded on the recording medium in an overlapping fashion; this makes efficient use of the recording medium having a limited capacity.

There is also provided a drive recorder including an acceleration sensor which outputs acceleration information representing acceleration applied to a vehicle, and a control unit which determines that a recording condition holds and records the video information on a recording medium when the acceleration information, after dropping to or below a first threshold, exceeds a second threshold which is greater than the first threshold.

According to the drive recorder of the present invention, since it is determined that the recording condition holds only when acceleration information equal to or greater than the second threshold large enough to indicate the occurrence of an accident or the like is detected after the acceleration information has dropped to or below the relatively low second threshold, video information that need not necessarily be recorded can be prevented from continuing to be recorded on the recording medium.

BRIEF DESCRIPTION OF THE DRAWINGS

FIG. 28 is a diagram showing one example of a peak master file.

DETAILED DESCRIPTION OF THE PREFERRED EMBODIMENT

Embodiments of the present invention will be described in detail below with reference to the drawings. It should be noted, however, that the technical scope of the present invention is not limited to the specific embodiments described herein, but extends to the inventions described in the appended claims and their equivalents. It should also be noted that the present invention can be carried out in other ways by making various changes without departing from the spirit and scope of the invention.

First, information recording in a drive recorder will be described.

Figure 1:
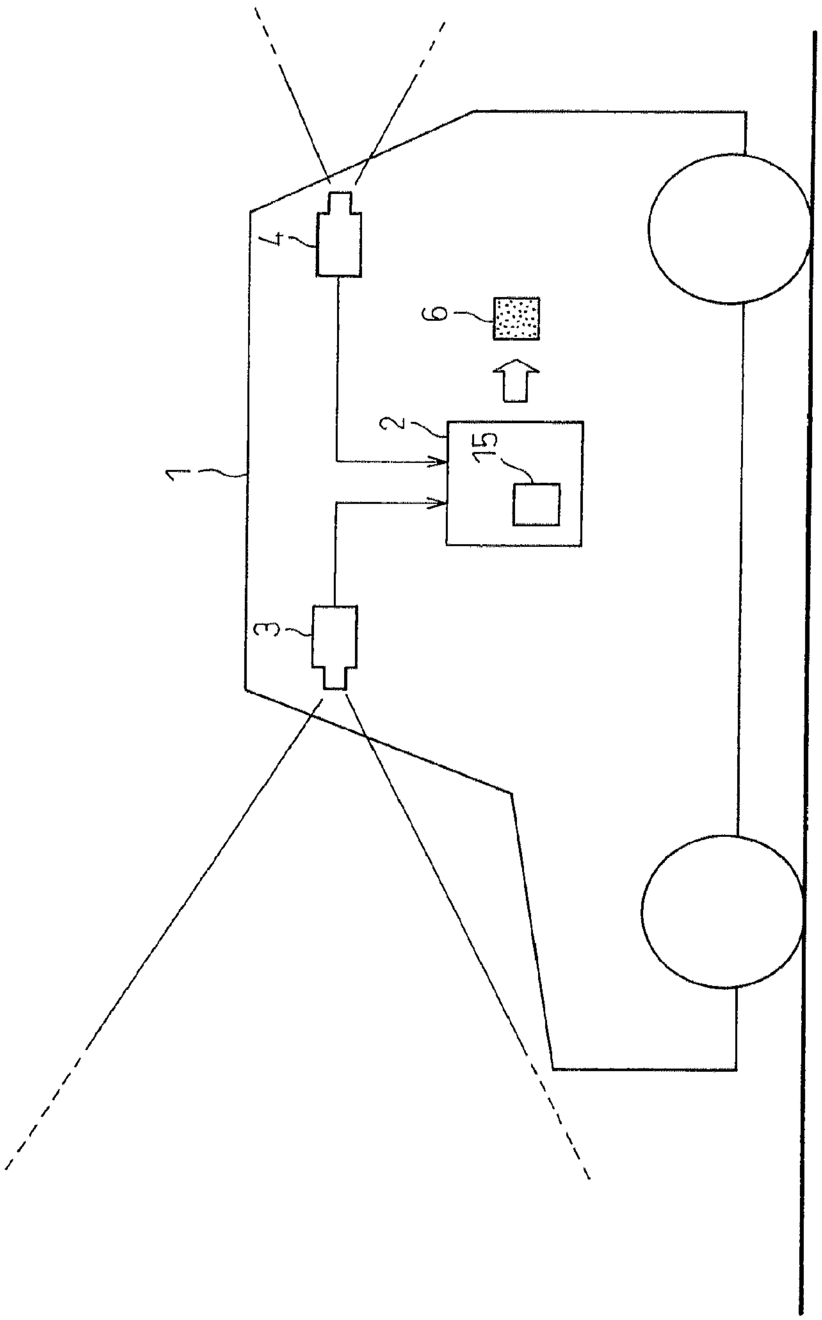
FIG. 1 is a diagram showing an example in which a drive recorder is mounted in a vehicle.

FIG. 1 is a diagram showing an example in which the drive recorder 2 is mounted in a vehicle 1.

The drive recorder 2 mounted in the vehicle 1 is connected to a first camera 3 for capturing a view ahead of the vehicle 1 and a second camera 4 for capturing a view behind the vehicle 1. Video information from the first camera 3, etc., is stored in a semiconductor storage unit 15 in a continuously looping fashion. If a predetermined recording condition holds, the video information stored in the semiconductor storage unit 15 is transferred for recording on a memory card 6. The predetermined recording condition refers to an event that occurs, for example, when the vehicle 1 is subjected to an impact due to an accident or the like, and the details will be described later.

In addition to the video information, the drive recorder 2 acquires vehicle operational information including vehicle speed information, and stores the information in a continuously looping fashion in the semiconductor storage unit 15 contained in the drive recorder 2. Each time the recording condition holds, the vehicle operational information is recorded on the memory card 6 together with the video information by being associated with the video information. The details of the vehicle operational information will be described later.

Figure 2:
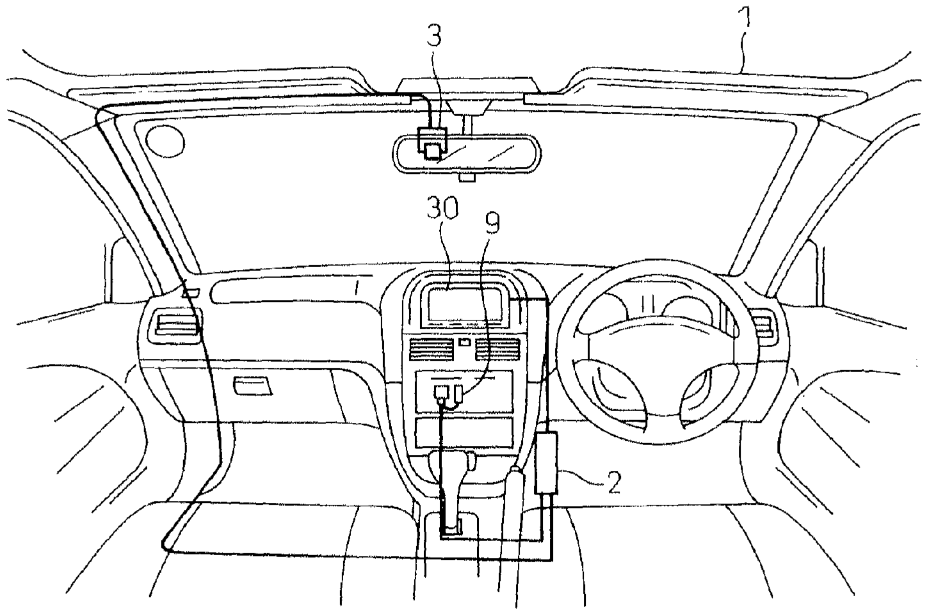
FIG. 2 is a diagram showing an example of how the drive recorder, etc., are arranged in the vehicle.

FIG. 2 is a diagram showing an example of how the drive recorder 2 is arranged in the vehicle 1.

The drive recorder 2 is fixed, for example, to one side of the center panel at a position to the lower left of the steering wheel, and is electrically connected to the first camera 3 (and the second camera 4 not shown in FIG. 2) and also to a GPS sensor 9, a vehicle speed sensor 10 not shown, a battery 21 not shown, a vehicle-mounted display unit 30, etc. The first camera 3, which is attached to the inside of the windshield behind the rearview mirror in the passenger compartment, captures the view ahead of the vehicle and transmits video information to the drive recorder 2.

Figure 3:
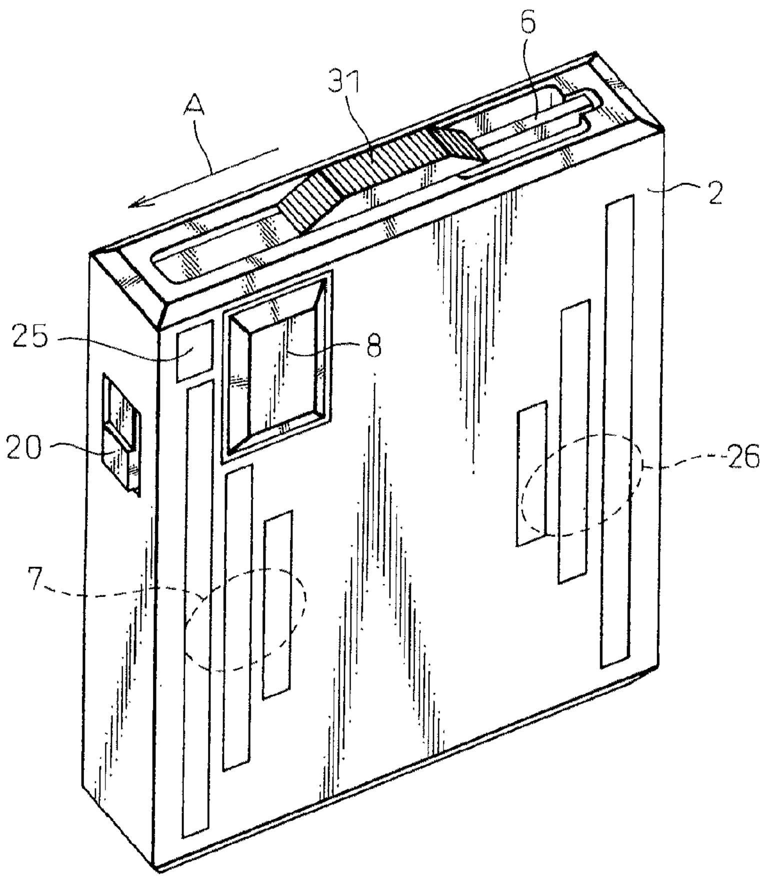
FIG. 3 is a perspective view of the main unit of the drive recorder.

FIG. 3 is a perspective view of the main unit of the drive recorder 2.

The drive recorder 2 includes a microphone 7, an image capture switch 8, a power switch 20, an LED 25, a buzzer 26, an open/close sensor 27 not shown, and an open/close knob 31.

The microphone 7 picks up sound inside the vehicle 1. The image capture switch 8 is used to enter various inputs to the drive recorder 2, such as the timing for starting to record video information in the drive recorder 2 and the initialization of the drive recorder 2. The LED 25 and buzzer 26 each have the function of alerting the user to the condition of the drive recorder 2 by generating a visual or audible warning, etc.

After the memory card 6 is inserted into a slot of an I/F 11 to be described later, the open/close knob 31 is moved slidingly into position to provide a protective covering for the memory card 6 (this condition is shown in FIG. 3). When removing the memory card 6, the open/close knob 31 is slid in the direction of arrow A. The open/close sensor 27 in the drive recorder 2 operates in conjunction with the open/close knob 31, and outputs an OFF signal indicating “closed” when the open/close knob 31 is closed to cover the memory card 6 (the condition shown in FIG. 3) and an ON signal indicating “open” when the open/close knob 31 is opened to allow the memory card 6 to be removed.

Figure 4:
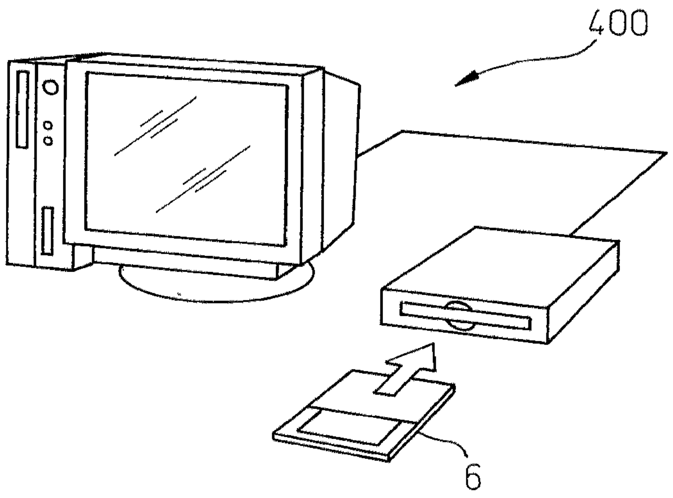
FIG. 4 is a diagram showing an example of an external view of a playback apparatus.

FIG. 4 is a diagram showing an example of an external view of a playback apparatus.

The video information, vehicle operational information, etc., recorded on the memory card 6 are played back on the playback apparatus 400 which includes a personal computer, etc. The memory card 6 is inserted into the I/F connected to the personal computer, and the video information, vehicle operational information, etc. are loaded into the personal computer. The user can, for example, investigate the vehicle driving conditions or the cause of a vehicle accident by playing back the video information, vehicle operational information, etc.

Figure 5:
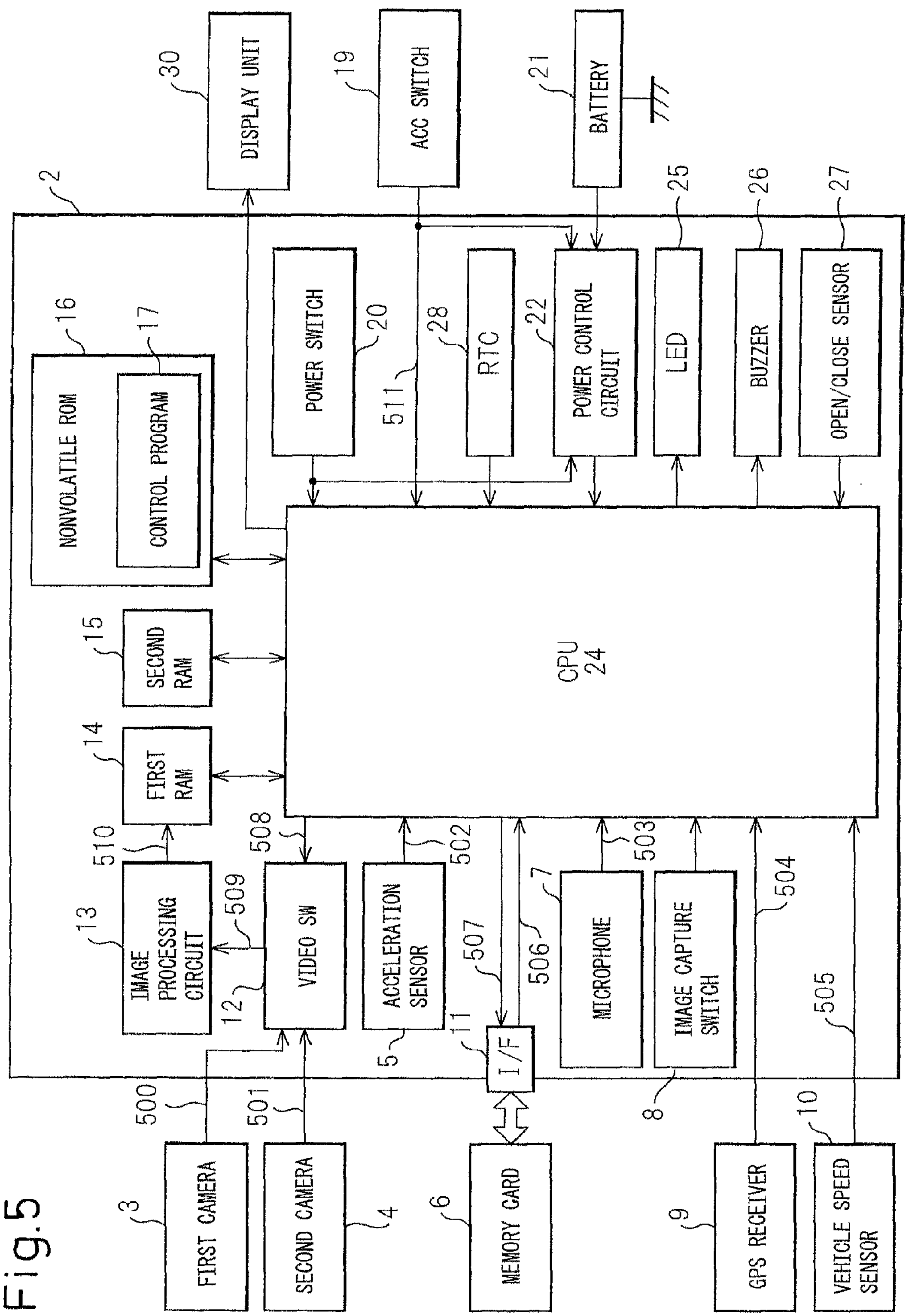
FIG. 5 is a block diagram showing the electrical configuration of the drive recorder.

FIG. 5 is a block diagram showing the electrical configuration of the drive recorder 2.

The first camera 3 is constructed, for example, from a two-dimensional image sensor, such as a CCD (Charge Coupled Device) image sensor or a CMOS (Complementary Metal Oxide Semiconductor) image sensor, and is controlled so as to capture the view ahead of the vehicle 1 and to output an analog video signal as first video information 500.

The second camera 4 is installed as an additional camera in the vehicle 1, and is controlled so as to capture the view behind the vehicle or view in a direction different than the first camera 3, for example, in the direction of the passenger compartment, and to output an analog video signal as second video information 501. If only one camera suffices, there is no need to connect the second camera 4 to the drive recorder 2.

An acceleration sensor 5 is constructed from a so-called G sensor (Gravity Accelerative Sensor) that detects the magnitude of an impact applied to the vehicle 1 as the magnitude of gravitational acceleration. This sensor is constructed from a semiconductor that, when subjected to an impact, produces a current proportional to the gravitational acceleration, and detects the magnitude of the gravitational acceleration in the longitudinal, as well as the transverse direction of the vehicle and then supplies gravitational acceleration information 502 to a CPU 24.

The memory card 6 is a storage medium removable from the drive recorder 2, and is constructed from an SD card (Secure Digital Memory Card) which is a programmable nonvolatile semiconductor memory card. The memory card 6 is used to store video information and vehicle operational information. The memory card 6 is also used to separately store the recording condition to be described later and various other pieces of information such as the ID unique to the memory card 6 and data such as the ID or name of the user (for example, a taxi driver) that uses the memory card 6. The memory card 6 is provided with a dip switch which can be used to write-protect the memory card 6.

In the present embodiment, an SD card is used as the removable storage medium, but alternatively, use may be made of other types of removable memory cards (for example, CF (Compact Flash) card or memory stick), hard disk, or the like. Further, a hard disk may be built into the drive recorder 2 and used in place of the memory card 6; in that case, a transmitter circuit should be provided in the drive recorder 2 so that the video information and vehicle operational information recorded on the hard disk can be transmitted to the playback apparatus 400 by means of wireless communications.

The microphone 7 is electrically connected to the CPU 24, and is configured to pick up sound inside or outside the vehicle 1 and to transmit the sound as sound information 503 to the CPU 24. The sound information 503 is converted into a digital signal by an analog/digital converter contained in the CPU 24. It is preferable to use a unidirectional microphone whose sensitivity is the highest in the forward direction of the microphone so as not to unnecessarily pick up noise from the road.

The image capture switch (capture SW) 8, when operated by the user, transmits a signal to the CPU 24 electrically connected to it. In response, the CPU 24 performs control so that the video information and vehicle operational information stored in a second RAM 15 are transferred for recording on the memory card 6. That is, the operation of the capture SW 8 serves as an event that triggers the recording condition. Provisions may be made to record on the memory card 6 only the video information captured at the moment the capture SW 8 is operated. As will be described later, the capture SW 8 is also used as an operating means for using other functions of the drive recorder 2.

The GPS (Global Positioning System) receiver 9 receives from a plurality of GPS satellites radio signals carrying information such as the orbits of the satellites and time data generated by the atomic clocks mounted in the satellites, and acquires current position information by computing the relative differences in distance to the respective satellites from the time differences between the received radiowaves. Any position on the Earth can be identified by capturing radiowaves from at least three satellites. The GPS receiver 9 that detected the current position information transmits the position information and time information as GPS information 504 to the CPU 24.

The vehicle speed sensor 10 is constructed from a magnetic sensor or optical sensor which converts the rotation of the rotor mounted on the driveshaft of the vehicle 1 into a pulse signal 505 for output. The CPU 24 computes the speed of the vehicle 1 by calculating the number of revolutions of the driveshaft per unit time from the pulse signal received from the vehicle speed sensor 10.

The interface (I/F) 11 also serves as a slot provided in the drive recorder 2 for insertion of the memory card 6. The I/F 11 transfers recorded information 506, including the video information and vehicle operational information, from the drive recorder 2 to the inserted memory card 6, and transfers various pieces of information 507 prestored in the drive recorder 2 to the CPU 24.

A video switch (hereinafter "video SW") 12 is a switch for selecting the camera to be used for image capturing when a plurality of cameras are installed. In the present embodiment, the first and second cameras 3 and 4 are connected, and one or the other of the cameras is selected by a select signal 508 from the CPU 24. The video information from the selected camera is output as selected video information 509 to an image processing circuit 13. The video SW 12 may be provided with a timekeeping function so as to switch from one camera to the other at predetermined intervals of time.

The selected video information 509 supplied from the first or second camera 3 or 4 via the video SW 12 is converted into a digital signal by the image processing circuit 13 which thus creates and outputs image data 510. The image processing circuit 13 is constructed from a JPEG-IC (Joint Photographic coding Experts Group—Integrated Circuit), and generates data in JPEG format. In this case, the JPEG-IC writes 30 files per second to a first RAM (Random Access Memory) 14 by overwriting on a file-by-file basis, because the JPEG-IC does not have the function of outputting the data by specifying the address.

The first RAM 14 temporarily stores the image data 510 converted by the image processing circuit 13. The first RAM 14 is connected to a DMA (Direct Memory Access) circuit contained in the CPU 24, and one in every three input video frames, which means 10 files per second, is transferred by the DMA function to the second RAM 15 where the data is stored in a continuously looping fashion.

Thus, the video information converted by the image processing circuit 13 into the image data is stored in the second RAM (semiconductor storage unit) 15 in a continuously looping fashion together with the vehicle operational information.

The first and second RAMs 14 and 15 are each constructed from SDRAM (Synchronous Dynamic Random Access Memory). SDRAM is designed to operate synchronously with the CPU clock; therefore, SDRAM has short input/output latency, achieves higher access speeds than conventional DRAM (Dynamic Random Access Memory), and is thus suited to high-speed control operation when processing a large amount of video data at high speed.

A nonvolatile ROM 16 stores programs such as a control program 17 for centrally controlling the hardware resources constituting the drive recorder 2. A mask ROM may be used for the nonvolatile ROM 16, but if a programmable nonvolatile semiconductor memory, such as a flash memory, EEPROM (Erasable Programmable Read Only Memory), or ferroelectric memory, is used, it becomes possible to erase and rewrite programs.

The control program 17 is stored in the nonvolatile ROM 16, is loaded into the CPU 24 during power on of the drive recorder 2, and functions as a program for controlling various components and data processing operations.

An accessory switch (ACC switch) 19 is provided in an electrically integral fashion with the engine starting key cylinder of the vehicle 1. When the switch is turned on by the user operating the key, an accessory ON signal 511 is transmitted to the CPU 24 and the power control circuit 22 in the drive recorder 2. In response to the accessory ON signal 511 from the ACC switch 19, the power control circuit 22 supplies power to the drive recorder 2 which thus initiates control. Instead of the output signal of the ACC switch 19, an ignition key output signal (IG ON signal) may be used.

The power switch (power SW) 20 transmits a power ON signal to the CPU 24 and the power control circuit 22 in the drive recorder 2 when the power SW 20 is turned on by the user. This switch can be used when it is desired to operate the drive recorder 2 without turning on the ACC switch 17.

The battery 21 is mounted in the vehicle 1, and supplies power to the main unit of the drive recorder 2. The battery also supplies power to the power control circuit 22. Any battery can be used as long as it can be mounted in the vehicle 1 and can produce an electromotive force of 12 V.

The power control circuit 22 supplies the power from the battery 21 to the CPU 24 and other components of the drive recorder 2. The details of the power control circuit 22 will be described later.

The CPU (Central Processing Unit) 24 operates as a control unit for the drive recorder 2, and is constructed from a microcomputer or the like. The CPU 24 performs control of the various components of the drive recorder 2, data processing operations, etc., in accordance with the control program 17.

The LED 25 lights up during power on of the drive recorder 2 under control of the CPU 24, thus indicating to the user that the system is being powered on. Further, if a fault occurs in the drive recorder 2, for example, the CPU 24 causes the LED 25 to flash on and off in a predetermined manner to indicate the occurrence of the fault to the user.

In the event of a fault in the drive recorder 2, the CPU 24 also causes the buzzer 26 to sound an alarm in a predetermined manner to indicate the occurrence of the fault to the user.

The open/close sensor 27 outputs an open signal or closed signal as the open/close knob 31 is moved to the open position or closed position for insertion/removal of the memory card 6.

An RTC (Real Time Clock) 28 generates a signal corresponding to the current date and time and transmits the signal to the CPU 24.

The display unit 30 is constructed from a liquid crystal display or the like, and is used when playing back the video information recorded on the memory card 6 in a specific situation as will be described later. FIG. 2 has shown the configuration in which the display of a navigation system mounted in the vehicle is used as the display unit 30, but a separate display may be used the display unit 30. In the event of a vehicle accident, the cause of the accident can be investigated on the spot by using the display unit 30. In any case, the drive recorder 2 is preferably provided with an output port for outputting video information.

The drive recorder 2 may be constructed as an apparatus dedicated to video recording and may be combined with the first camera 3, the second camera 4, the GPS receiver 9, and/or the display unit 30, etc., into a single unit by housing them in the same cabinet.

Further, the drive recorder 2 may be incorporated into an automotive navigation system.

Figure 6:
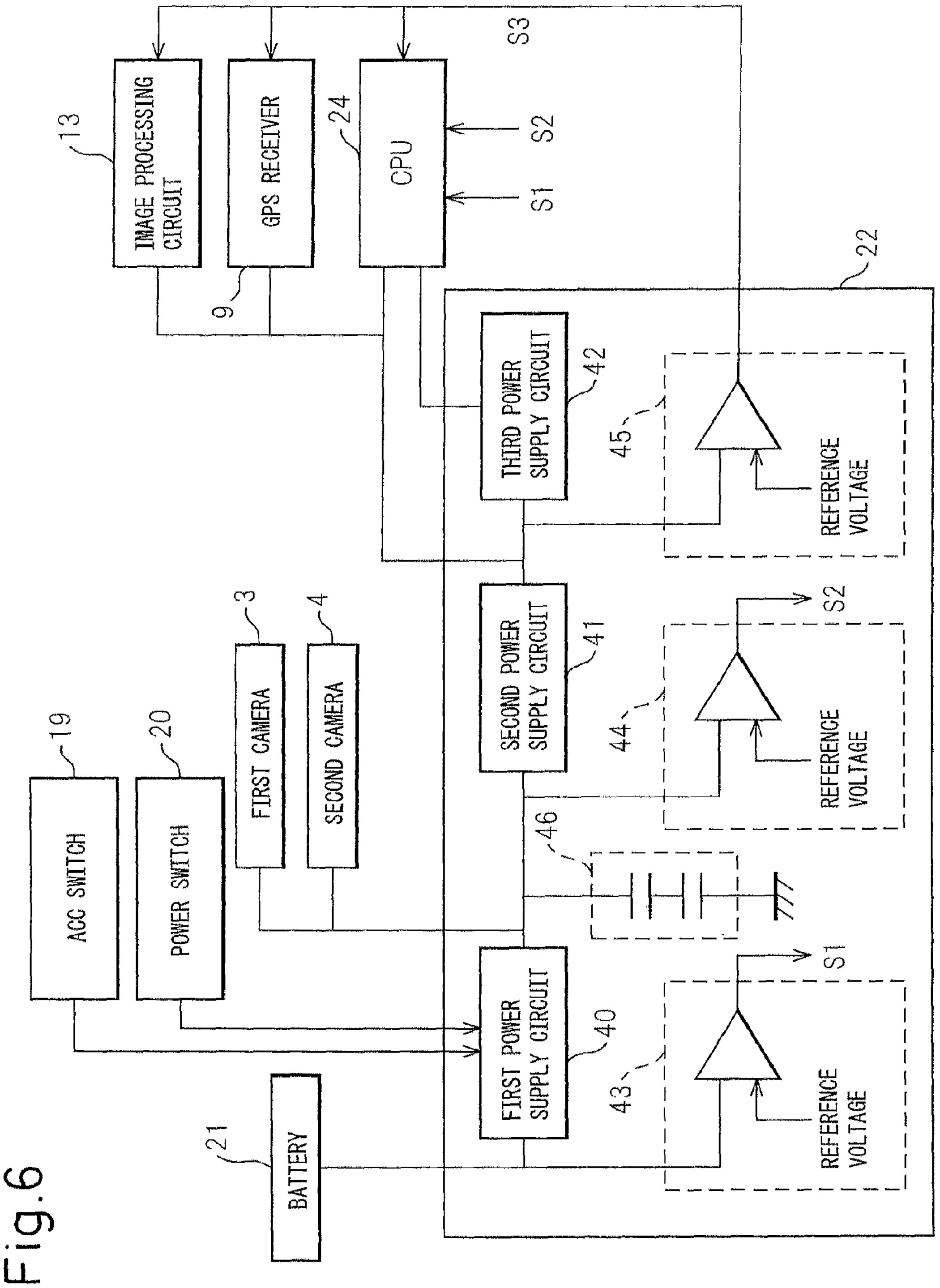
FIG. 6 is a block diagram showing the electrical configuration of a power control circuit.

FIG. 6 is a block diagram showing the electrical configuration of the power control circuit 22.

The power control circuit 22 comprises a first power supply circuit 40, a second power supply circuit 41, a third power supply circuit 42, a first detector 43, a second detector 44, a third detector 45, and a backup battery 46.

The first power supply circuit 40 starts to operate when the ACC switch 19 or the power switch 20 is turned on, and functions as a constant voltage power supply that produces an output of 6.0 V by receiving power from the battery 21 rated at 12.0 V. The output of the first power supply circuit 40 is supplied to the first and second cameras 3 and 4, etc.

The second power supply circuit 41 functions as a constant voltage power supply that produces an output of 3.3 V by receiving power from the first power supply circuit 40 rated at 6.0 V. The output of the second power supply circuit 41 is supplied to the JPEG circuit constituting the image processing circuit 13, as well as to the GPS receiver 9, CPU 24, etc.

The third power supply circuit 42 functions as a constant voltage power supply that produces an output of 1.8 V by receiving power from the second power supply circuit 41 rated at 3.3 V. The output of the third power supply circuit 42 is supplied to the CPU 24, etc.

The first detector 43 detects the output voltage of the battery 21 and, if the output voltage of the battery 21 drops to 8.0 V or lower, supplies a first voltage drop signal S1 to the CPU 24. The second detector 44 detects the output voltage of the first power supply circuit 40 and, if the output voltage of the first power supply circuit 40 drops to 3.7 V or lower, supplies a second voltage drop signal S2 to the CPU 24. Further, the third detector 45 detects the output voltage of the second power supply circuit 41 and, if the output voltage of the second power supply circuit 41 drops to 3.0 V or lower, supplies a reset signal S3 to the JPEG circuit constituting the image processing circuit 13 as well as to the GPS receiver 9 and the CPU 24 and thereby resets the components in order to prevent them from malfunctioning due to the low voltage.

The backup battery 46 comprises two capacitors, and is constructed to be able to supply power so that, even when the output voltage of the battery 21 has dropped, at least the JPEG circuit constituting the image processing circuit 13, the GPS receiver 9, and the CPU 24 can operate for a predetermined period of time. When an impact is applied to the vehicle in the event of an accident, such as a collision, the battery 21 may be damaged or the connecting line between the battery 21 and the power supply control circuit 22 may be broken; if this happens, the backup battery 46 supplies the stored power to the CPU 24, etc., so that the video information, etc., currently being processed can be saved as much as possible. The processing performed at the time of a voltage drop will be described later.

Figure 7:
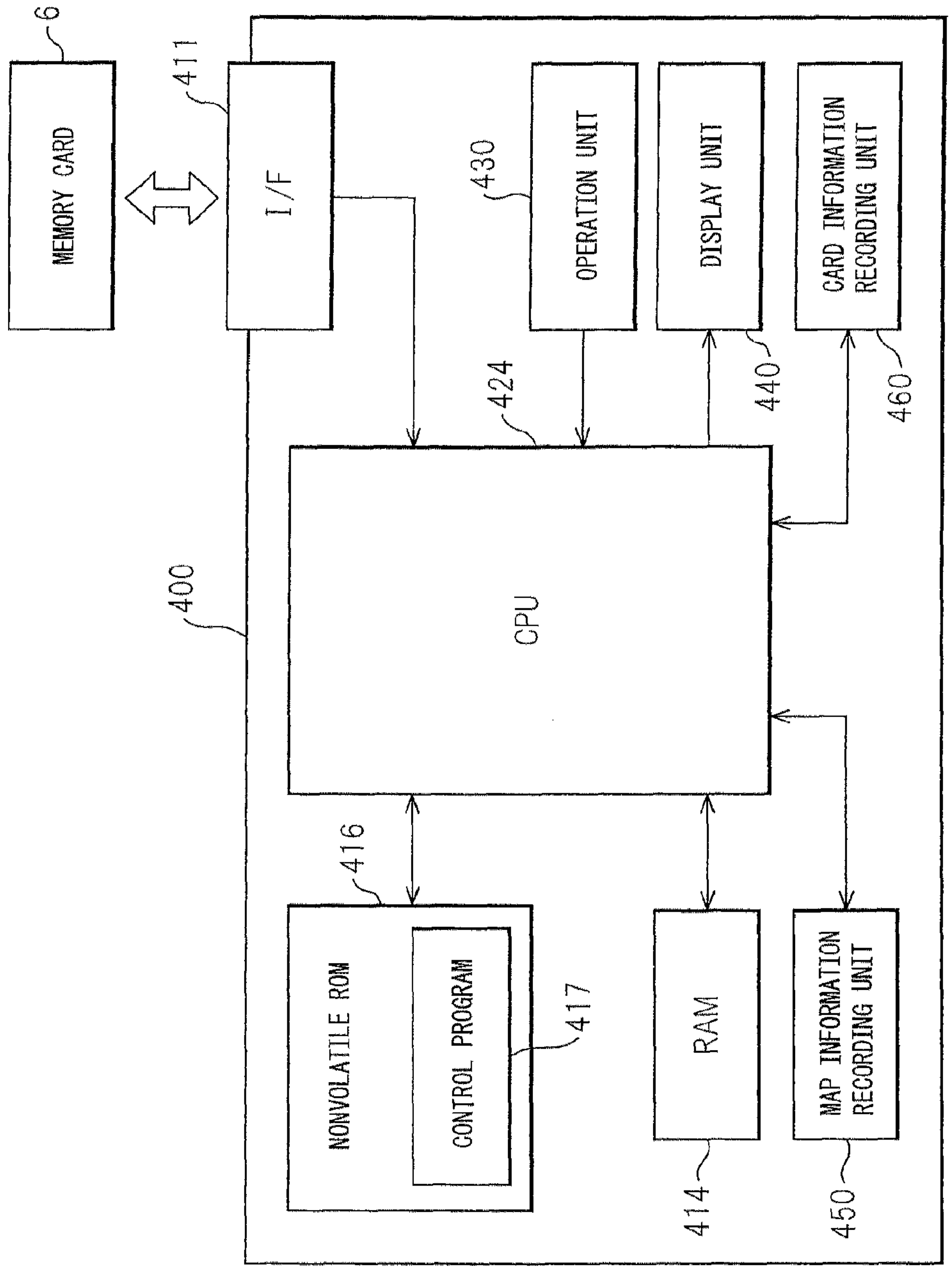
FIG. 7 is a block diagram showing the electrical configuration of the playback apparatus.

FIG. 7 is a block diagram showing the electrical configuration of the playback apparatus 400.

An interface (I/F) 411 serves as a slot provided in the playback apparatus 400 for insertion of the memory card 6. The I/F 411 transfers the video information, vehicle operational information, etc., recorded on the memory card 6 to the playback apparatus 400.

A RAM 414 is used to temporarily store data when a CPU 424 processes the video information, vehicle operational information, etc., transferred from the memory card 6. The RAM 414 is constructed, for example, from SDRAM.

A nonvolatile ROM 416 stores programs such as a control program 417 for centrally controlling the hardware resources constituting the playback apparatus 400. The nonvolatile ROM 416 is constructed, for example, from EEPROM, ferroelectric memory, or the like.

The control program 417 is stored in the nonvolatile ROM 416, is loaded into the CPU 424 during power on of the playback apparatus 400, and functions as a program for controlling various components and data processing operations.

The CPU 424 operates as a control unit for the playback apparatus 400, and is constructed from a microcomputer or the like. The CPU 424 performs control of the various components of the playback apparatus 400, data processing operations, etc., in accordance with the control program 417.

An operation unit 430 comprises a keyboard, mouse, etc., and is used as a means for entering operation inputs to the CPU 424 when the user operates the playback apparatus 400.

A display unit 440 is constructed from a liquid crystal display or the like, and is used to suitably display the video information, vehicle operational information, etc., recorded on the memory card 6.

A map information recording unit 450 is constructed from a recording medium such as a hard disk or DVD, and stores map information including road information and speed limit information.

A card information recording unit 460 is constructed from a recording medium such as a hard disk, and is used to record the video information, vehicle operational information, etc., transferred from the memory card 6.

Figure 8:
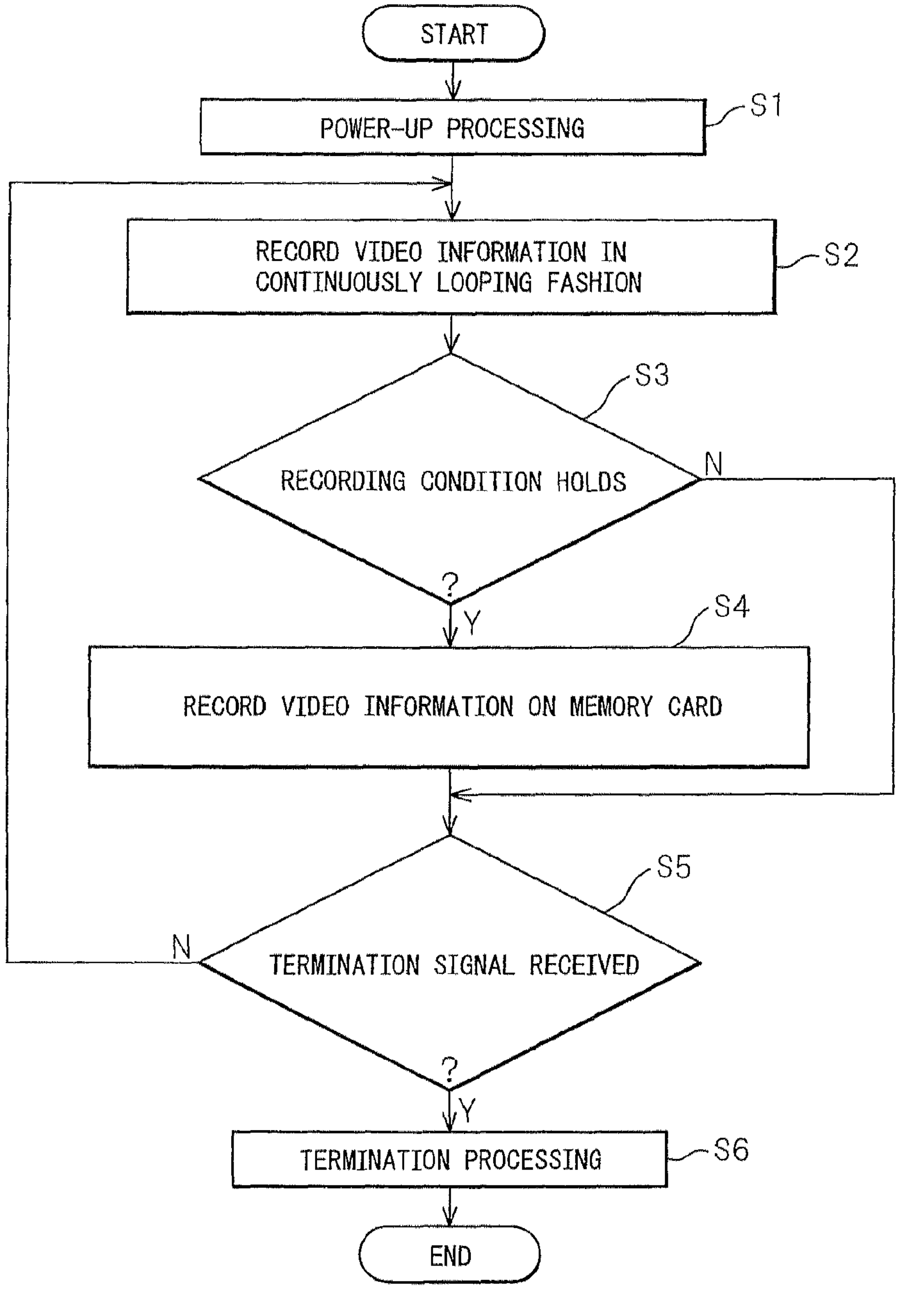
FIG. 8 is a diagram showing an example of a process flow of the drive recorder.

FIG. 8 is a diagram showing the overall process flow of the drive recorder 2.

The process flow shown in FIG. 8 is performed primarily by the CPU 24 in the drive recorder 2 in cooperation with the various component elements of the drive recorder 2 in accordance with the control program 17.

When power is turned on to the drive recorder 2 by turning on the ACC switch 19 or power switch 20, the CPU 24 performs power-up processing (S1). The power-up processing includes initialization by a boot program and self-diagnosis of the various elements related to the drive recorder 2. The self-diagnosis will be described later.

When the power-up processing of the drive recorder 2 is completed, the CPU 24 starts to store video information in the second RAM 15 in a continuously looping fashion (S2). More specifically, the CPU 24 acquires still image data (640×480 pixels) from the first camera 3 and the second camera 4, alternately, at a rate of 10 frames per second (i.e., still images from the camera 3 and still images from the camera 4 are respectively acquired at intervals of 0.2 second in an alternating fashion), and stores the thus acquired data in a continuously looping fashion in the second RAM 15 by way of the first RAM 14. Further, each time the still image data is acquired from the first camera 3 and the second camera 4, the CPU 24 acquires vehicle operational information and stores the vehicle operational information in a continuously looping fashion in the second RAM 15 by associating the information with the still image data. The intervals of time at which the CPU 24 acquires the still image data and the number of still image frames to be acquired, described above, are only illustrative and not restrictive.

Next, the CPU 24 determines whether the recording condition hereinafter described holds or not (S3). If any of the following three events occurs, it is determined that the recording condition holds. One or two of the following events may be used, or some other event than the following three may be defined.

1. G detection: The acceleration sensor 5 has detected a gravitational acceleration of 0.40 G or greater. In this case, it is determined that the recording condition holds, because when such a gravitational acceleration is applied to the vehicle 1, the situation can be determined as being the occurrence of an accident or the imminence of an accident. The above set value (0.40 G) is only one example, and some other suitable value may be employed. The details will be described later.

2. Speed trigger: The rate of change of the speed of the vehicle 1 detected by the vehicle speed sensor 10 over a predetermined period of time has become equal to or exceeded a threshold value. For example, when the vehicle is traveling at a speed of 60 km/h or higher, if the rate of deceleration of the vehicle in one second has become equal to or exceeded 14 km/h, then it is determined that the recording condition holds. The reason is that when the vehicle 1 has decelerated at such a rate, the situation can be determined as being the occurrence of an accident or the imminence of an accident. The above criterion (when the vehicle is traveling at a speed of 60 km/h or higher, the rate of deceleration in one second becomes equal to or exceeds 14 km/h) is only one example, and some other suitable criterion may be employed.

3. Image capture SW: The image capture SW 8 is operated.

If the recording condition holds, the CPU 24 performs control so that a total of 20 seconds of video information, i.e., 12 seconds before and 8 seconds after the occurrence of the recording condition (a total of 200 still images for each occurrence of the recording condition), is transferred together with its associated vehicle operational information from the second RAM 15 to the memory card 6 for recording thereon (S4). Further, when the recording condition holds, event data indicating the event that triggered the recording condition (i.e., data indicating one of the three above events) is also recorded on the memory card 6. The memory card 6 has a capacity that can store video information, etc., for at least 15 events.

Provisions may be made so that, when the recording condition holds, the sound information acquired from the microphone 7 for a total of 20 seconds, i.e., 12 seconds before and 8 seconds after the occurrence of the recording condition, is also recorded on the memory card 6 together with the video information, etc. Since the video information, vehicle operational information, etc., recorded on the memory card 6 can be displayed on the playback apparatus 400, the user of the drive recorder 2 can investigate the driving conditions of the vehicle 1 and the situation that led up to an accident. The length of time that the CPU 24 records the information on the memory card 6 when the recording condition holds (i.e., 12 seconds before and 8 seconds after the occurrence of the recording condition), described above, is only illustrative and not restrictive.

The vehicle operational information includes the following information.

1. Gravitational acceleration information (G1, G2) detected along the respective axes of the acceleration sensor 5.

2. Position information of the vehicle 1 and time information detected by the GPS receiver 9.

3. Speed information detected by the vehicle speed sensor 10.

4. ON/OFF information of the ACC switch 19.

The contents of the vehicle operational information are not necessarily limited to the above information, but may also include information concerning the operation and driving of the vehicle 1, such as the steering angle and the ON/OFF states of various lights including turn signal lights.

Next, the CPU 24 determines whether a termination signal effected by the OFF signal of the ACC switch 19 or power switch 20 is received or not (S5); if the termination signal is received, termination processing is performed (S6) to terminate the sequence of operations. If the termination signal is not yet received, the process from S2 to S4 is repeated.

Self-diagnosis of the drive recorder 2 will be described below.

The self-diagnosis of the drive recorder 2 is performed in the power-up process (S1) in the process flow shown in FIG. 8, and the acceleration sensor 5, the JPEG-IC constituting the image processing circuit 13, the RTC 28, and the connection state of the first and second cameras 3 and 4 are self-diagnosed. The reason that the self-diagnosis of the drive recorder 2 is performed is that the data recorded by the drive recorder 2 may be used as evidentiary data when investigating the cause of an accident, etc. It is therefore necessary to check in advance whether the drive recorder 2 can record data properly and whether there is any problem with the recorded data.

Figure 9:
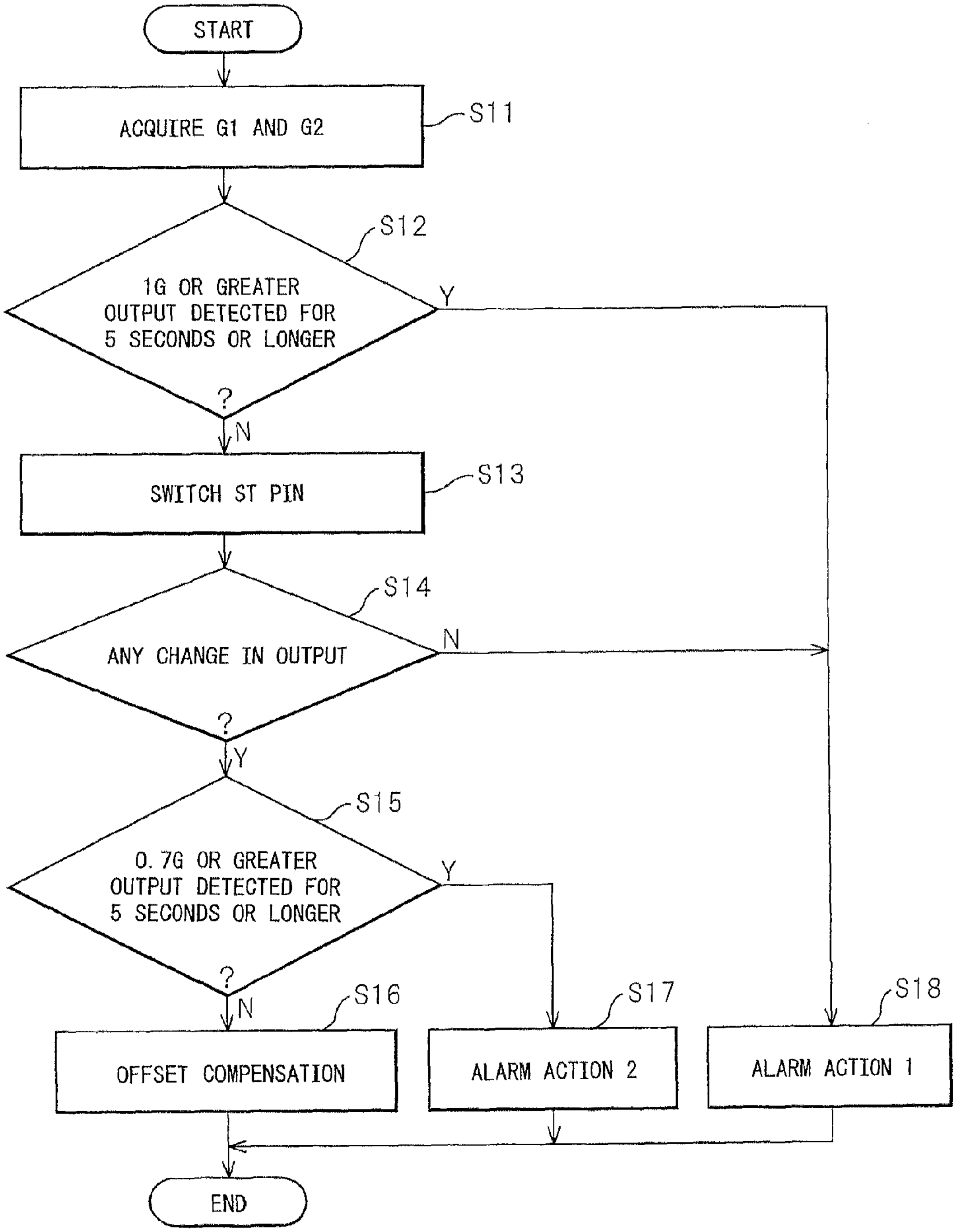
FIG. 9 is a diagram showing a self-diagnosis process flow of the drive recorder.

FIG. 9 is a diagram showing a process flow for the self-diagnosis of the drive recorder 2.

First, of the three axes (x axis, y axis, and z axis) of the acceleration sensor 5, the CPU 24 acquires the output G1 of a first predefined axis which is parallel to the longitudinal direction of the vehicle 1 and the output G2 of a second predefined axis which is parallel to the transverse direction of the vehicle 1 (S11).

Figure 10A:
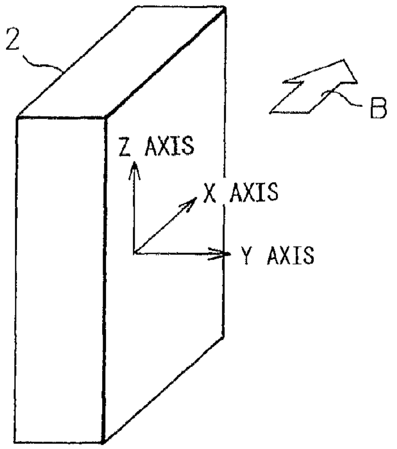
FIG. 10(*a*) is a diagram showing an arrangement in which the drive recorder 2 is installed in an upright position in the vehicle 1, FIG. 10(*b*) is a diagram showing an arrangement in which the drive recorder 2 is installed in a horizontal position in the vehicle 1, and FIG. 10(*c*) is a diagram showing an arrangement in which the drive recorder 2 is tilted by an angle θ relative to the position shown in FIG. 10(*b*).
Figure 10B:
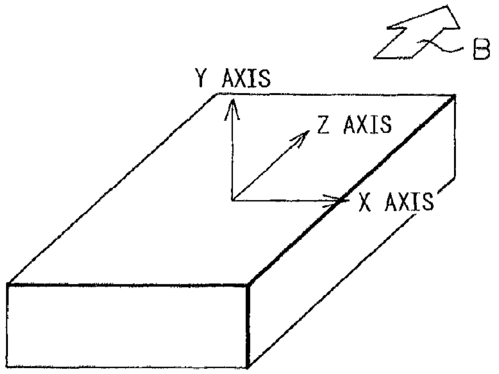
Figure 10C:
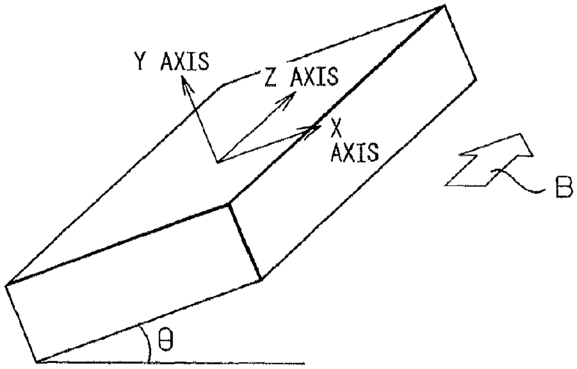

FIG. 10 is a diagram showing the positional relationship between the drive recorder 2 and the acceleration sensor 5. FIG. 10(*a*) shows an arrangement in which the drive recorder 2 is installed in an upright position in the vehicle 1 (see FIG. 2), FIG. 10(*b*) shows an arrangement in which the drive recorder 2 is installed in a horizontal position in the vehicle 1, and FIG. 10(*c*) shows an arrangement in which the drive recorder 2 is tilted by an angle θ relative to the position shown in FIG. 10(*b*). In FIGS. 10(*a*) to 10(*c*), the direction of arrow B indicates the traveling direction of the vehicle.

The acceleration sensor 5 has three axes, but when the drive recorder 2 is arranged as shown in FIG. 10(*a*), the output of the x axis is defined as the output G1 of the first axis and the output of the y axis as the output G2 of the second axis, and the output of the z axis is not used. On the other hand, when the drive recorder 2 is arranged as shown in FIG. 10(*b*), the output of the z axis is defined as the output G1 of the first axis and the output of the x axis as the output G2 of the second axis, and the output of the y axis is not used. Since the drive recorder 2 uses the acceleration sensor 5 having three output axes, as described above, the drive recorder 2 can be arranged in any desired orientation. However, in this case, it is required to determine in advance which axes are used as the first and second axes. Therefore, when installing the drive recorder 2 in the vehicle, the two axes to be used are selected in advance from among the x, y, and z axes.

Next, the CPU 24 determines whether any one of the outputs G1 and G2 of the first and second axes acquired in S11 has been producing a value of 1 G or greater for five seconds or longer (S12). In the normal condition, both axes should output 0 G; therefore, if an acceleration of 1 G or greater has been detected for five seconds or longer, it can be determined that some kind of fault has occurred in the acceleration sensor element.

If it is determined in S12 that neither axis has been outputting a value of 1 G or greater for five seconds or longer, the CPU 24 switches a test mode pin (ST pin) on the acceleration sensor 5 (S13) to create a situation where vibration is generated electrically, and detects its output to determine whether any change has occurred in the output (S14). If the output of the acceleration sensor 5 does not change despite the switching of the ST pin, it can be determined that it is highly likely that the acceleration sensor 5 is not operating properly.

If a change in the output is detected in S14, the CPU 24 proceeds to determine whether any one of the outputs G1 and G2 of the first and second axes acquired in S11 has been producing a value of 0.7 G or greater for five seconds or longer (S15). In such cases, it can be determined that while the acceleration sensor 5 itself may operate properly, it is highly likely that the axes predefined as the first and second axes do not match the initial setting, i.e., the drive recorder 2 originally arranged as shown in FIG. 10(*a*) has been reoriented, for example, as shown in FIG. 10(*b*), but the setting of the output axes has not been changed. For example, when the position is changed from that shown in FIG. 10(*a*) to that shown in FIG. 10(*b*), the y axis originally set as the second axis is now pointing in the vertical direction, producing an output of 0.7 G or greater in terms of gravity.

If it is determined in S15 that neither axis has been outputting a value of 0.7 G or greater for five seconds or longer, the CPU 24 determines that the acceleration sensor 5 is operating properly, and performs processing to compensate for the offsets of the outputs G1 and G2 of the first and second axes, i.e., to correct the values acquired in S11 to 0 (S16), after which the sequence of operations is terminated. A possible cause for the offsets is that the drive recorder 2 is not mounted completely parallel relative to the vehicle 1. For example, the drive recorder 2 that should have been installed as shown in FIG. 10(*b*) may be installed in a tilted position as shown in FIG. 10(*c*). The drive recorder 2 is constructed so that, by compensating for the offsets, it can operate properly unless the tilt angle $\phi$ shown in FIG. 10(*c*) is larger than about 30 degrees.

If it is determined in S12 that any one of the outputs G1 and G2 of the first and second axes acquired in S11 has been producing a value of 1 G or greater for five seconds or longer, or if no change is detected in the output in S14, the CPU 24 determines that the acceleration sensor 5 is faulty, and notifies the user of the occurrence of the fault by turning on the LED 25 and issuing an alarm sound from the buzzer 26; at the same time, the CPU 24 deactivates other components than the LED 25 and the buzzer 26, and continues the above alarm action until the ACC switch 19 or the power switch 20 is turned off (S18).

If it is determined in S15 that any one of the outputs G1 and G2 of the first and second axes acquired in S11 has been producing a value of 0.7 G or greater for five seconds or longer, the CPU 24 determines that the setting of the output axes has not been changed after changing the orientation of the drive recorder 2, and notifies the user of the occurrence of the fault by turning on the LED 25 and issuing an alarm sound from the buzzer 26; this alarm action is continued until the ACC switch 19 or the power switch 20 is turned off (S17). However, the drive recorder 2 is allowed to continue operation, since the acceleration sensor 5 itself operates properly.

Next, the self-diagnoses of the JPEG-IC constituting the image processing circuit 13, the RTC 28, and the connection state of the first and second cameras 3 and 4 will be described below.

For the JPEG-IC constituting the image processing circuit 13, the CPU 24 is constantly monitored for an interrupt signal to be input thereto at intervals of 16.7 ms, and if no interrupt occurs for a period of 500 ms, the CPU 24 determines that a fault has occurred in the JPEG-IC constituting the image processing circuit 13. If it is determined that a fault has occurred, the CPU 24 notifies the user of the occurrence of the fault by turning on the LED 25 and issuing an alarm sound from the buzzer 26; at the same time, the CPU 24 deactivates other components than the LED 25 and the buzzer 26, and continues the above alarm action until the ACC switch 19 or the power switch 20 is turned off. The interrupt monitoring intervals of 16.7 ms and the monitoring period of 500 ms are only illustrative and not restrictive.

For the RTC 28, the CPU 24 monitors the status bits indicating the year, month, date and time, second, etc., being received from the RTC 28, and if data that does not fall within a predefined range is received, it is determined that a fault has occurred. If it is determined that a fault has occurred, the CPU 24 notifies the user of the occurrence of the fault by turning on the LED 25 and issuing an alarm sound from the buzzer 26, and resets the internal RTC of the CPU 24 to a predetermined value (for example, 0 hours, 0 minutes, 0 seconds, Jan. 1, 2001). Other normal operation of the drive recorder 2 is allowed to continue.

For the connection state of the first and second cameras 3 and 4, the CPU 24 determines that a fault has occurred (the connection between the drive recorder 2 and the first and second cameras 3 and 4 is broken), if the data size of each image frame transferred from the first RAM 14 to the second RAM 15 has continued to be 6592 bytes for 10 seconds or longer. The size of 6592 bytes corresponds to the image data size when the image created by the JPEG-IC used in the drive recorder is an all black image. The JPEG-IC is preset to output a black image when there is no video input from the cameras 3 and 4. Accordingly, if the JPEG-IC has been outputting all black images continuously for a predetermined period (for example, 10 seconds), it can be determined that the connection between the drive recorder 2 and the first and second cameras 3 and 4 is broken. The CPU 24 notifies the user of the occurrence of the fault by turning on the LED 25 and issuing an alarm sound from the buzzer 26; at the same time, the CPU 24 deactivates other components than the LED 25 and the buzzer 26, and continues the above alarm action until the ACC switch 19 or the power switch 20 is turned off. The image data size of 6592 bytes to be detected and the monitoring period of 10 seconds are only illustrative and not restrictive. Further, if the JPEG-IC is preset to output some other color image than black (for example, a blue color image) when there is no video input to the JPEG-IC, provisions should be made to detect a fault based on the data size of that color image.

The self-diagnosis to check the connection state of the first and second cameras 3 and 4 may be performed not only during power-up of the drive recorder 2 but also constantly during the operation of the drive recorder 2.

Since the drive recorder 2 according to the present invention performs self-diagnostic tests to verify proper operation of the components during power-up, etc., the validity of the video information and vehicle operational information can be ensured.

Figure 11:
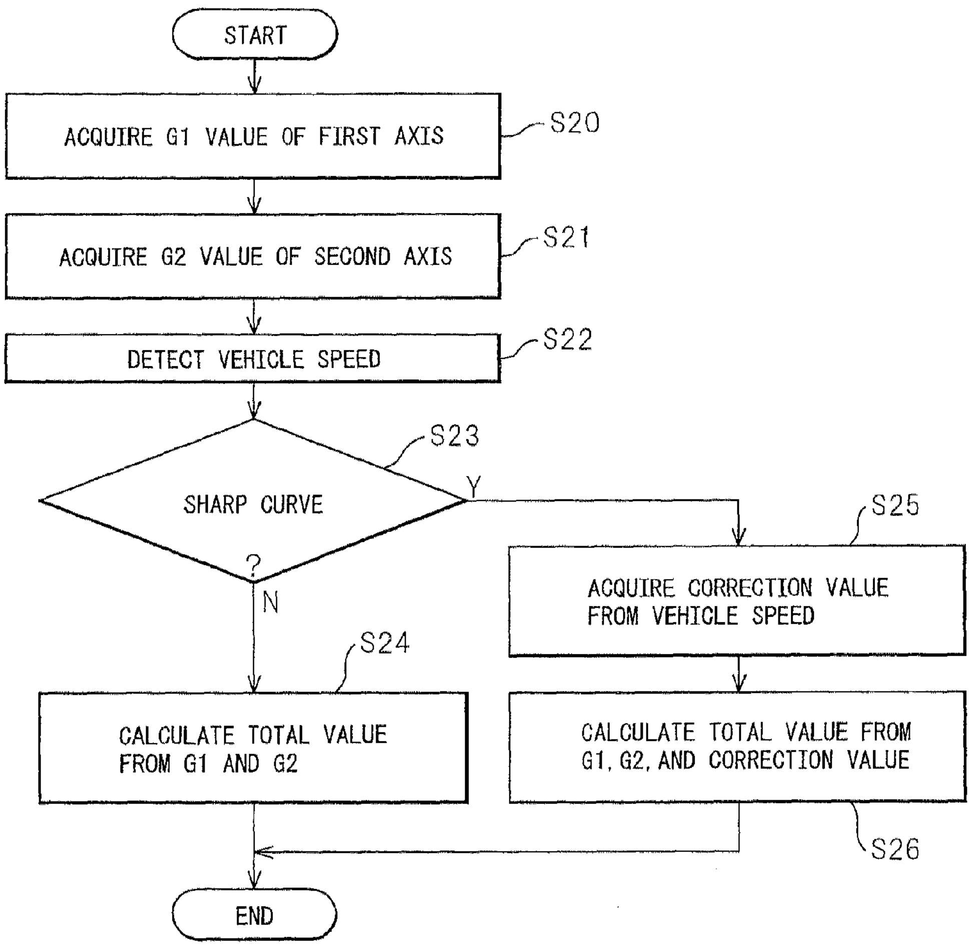
FIG. 11 is a diagram showing a G-value detection process flow.

FIG. 11 is a diagram showing a G-value detection process flow.

The CPU 24 determines the G value based on the outputs of the acceleration sensor 5 in accordance with the process flow shown in FIG. 11. Then, based on the G value detected in accordance with the process flow of FIG. 11, the CPU 24 determines whether the recording condition related to the earlier described G detection holds or not, as will be described later.

First, the CPU 24 acquires the output G1 of the first predefined axis and the output G2 of the second predefined axis (S20 and S21).

Next, the CPU 24 detects the current speed of the vehicle 1 based on the vehicle speed pulse signal received from the vehicle speed sensor 10 (S22).

Then, the CPU 24 determines whether the road section on which the vehicle 1 is currently traveling corresponds to a sharp curve or not, based on the current position information of the vehicle 1 received from the GPS receiver 9 (S23). The CPU 24 may obtain the "sharp curve or not" information from the navigation system (now shown) connected to the drive recorder 2, or the drive recorder 2 itself may include a storage unit (not shown) that stores map information, and the "sharp curve or not" information may be obtained by comparing the current position information with the map information.

If it is determined in S23 that the road section is not a sharp curve, the total value of the absolute values of the first and second axis outputs G1 and G2 acquired in S20 and S21, i.e., $(G1^2+G2^2)^{0.5}$, is taken as the G value (S24).

On the other hand, if it is determined in S23 that the road section is a sharp curve, a correction value a determined in accordance with the vehicle speed detected in S22 is obtained, and a value $(G1^2+(|G2|-\alpha)^2)^{0.5}$, calculated from the correction value a and the first and second axis outputs G1 and G2 acquired in S20 and S21, is taken as the G value (S26). The correction value a can be set empirically, for example, to 0.1 when the vehicle speed is slower than 60 km/h and to 0.2 when the vehicle speed is 60 km/h or higher.

The reason that the correction value a is subtracted from the absolute value of G2 representing the output in the transverse direction of the vehicle 1 in the case of a sharp curve is that, when traveling along a sharp curve, the vehicle 1 tends to be subjected to an acceleration in the transverse direction, and the recording condition may erroneously hold when the situation is not a vehicle accident or the like. The output G2 is taken to be positive when the acceleration is in the rightward direction and negative when the acceleration is in the leftward direction.

In the above process, the determination as to whether the road section on which the vehicle 1 is currently traveling is a sharp curve or not may not be determined based on the current position information received from the GPS receiver 9, and the G value may be determined based on $(G1^2+(|G2|-\alpha)^2)^{0.5}$. Further, the correction value $\alpha$ may be set independently of the vehicle speed. Furthermore, the "sharp curve or not" determination may be made using other means, such as a steering angle sensor.

By determining the G value in accordance with the above G-value detection process flow, it is possible to prevent false recording conditions from occurring too often when the vehicle is traveling along a curve, and unnecessary video information, etc., can thus be prevented from being recorded on the memory card 6.

Figure 12:
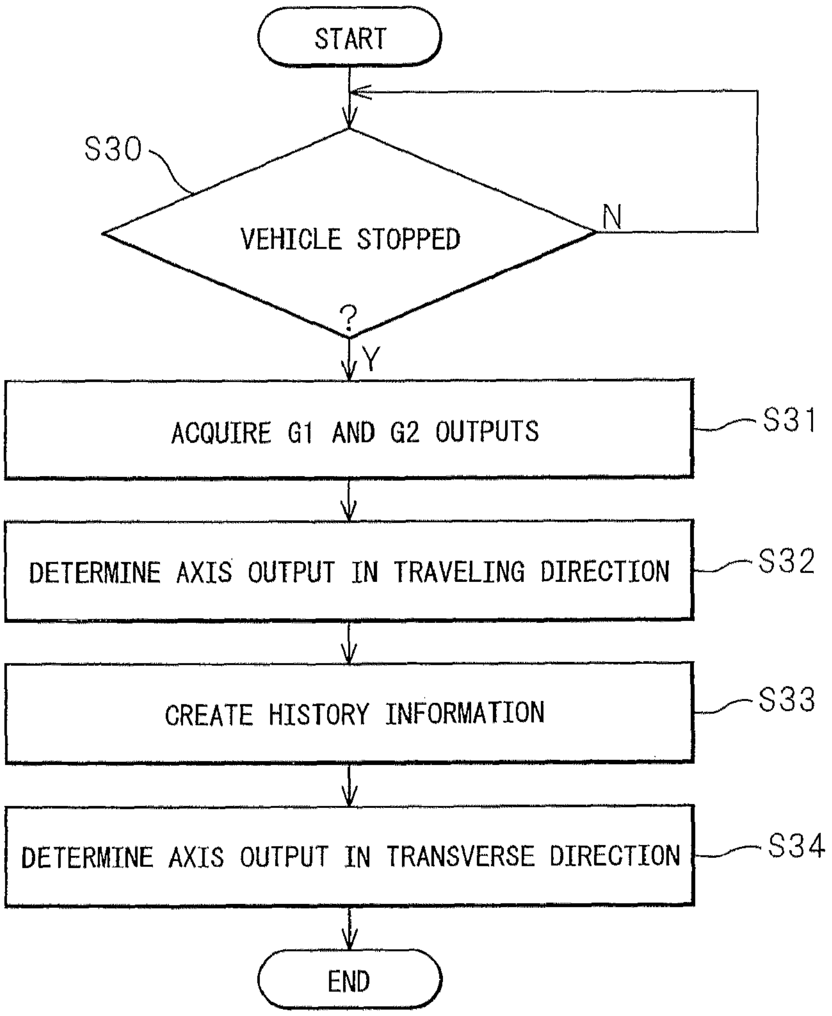
FIG. 12 is a diagram showing a process flow for verifying the outputs of an acceleration sensor 5.

FIG. 12 is a diagram showing a process flow for verifying the outputs of the acceleration sensor 5.

In the foregoing example, the first and second axes of the acceleration sensor 5 have been described as being predefined, but provisions may be made so that the CPU 24 can by itself redefine the two predefined axes. FIG. 12 show a process flow for this purpose.

First, the CPU 24 determines whether the vehicle 1 has stopped (S30). It can be determined that the vehicle has stopped, for example, when the G value obtained in the process flow of FIG. 11 has remained at 0.1 G or less for three seconds or longer. Alternatively, it may be determined that the vehicle has stopped when the vehicle speed detected by the vehicle speed sensor is slower than a predetermined speed (for example, 2 km/h).

Next, among the outputs produced by the acceleration sensor 5 immediately after the stopping of the vehicle, the CPU 24 acquires the output G1 of the first predefined axis and the output G2 of the second predefined axis (S31); then, of these two axes, the axis whose output increased to 0.2 G or greater when the vehicle 1 began to move after stopping is identified as the axis oriented parallel to the traveling direction (or the longitudinal direction) of the vehicle 1 (S32).

After identifying the axis oriented parallel to the traveling direction of the vehicle 1 in the above step, the CPU 24 stores information concerning the thus identified axis as history information in the second RAM 15 (S33).

Next, the CPU 24 identifies the output of the other axis than the one identified in S32, as the output of the second axis oriented in the transverse direction of the vehicle 1 (S34), and the sequence of operations is terminated.

The process shown in FIG. 12 is repeated each time it is determined that the vehicle 1 has stopped. The history information is collected by repeating the process flow of FIG. 12 a predetermined number of times; therefore, the axes may be identified based on the history information. Further, after identifying the axis output in the transverse direction of the vehicle 1 in a distinct manner by redefining the orientation of the axis as shown in FIG. 12, the axis output can be corrected by subtracting the correction value $\alpha$ from the absolute value of the output G2 of the second axis (in the transverse direction of the vehicle) of the acceleration sensor 5 as earlier shown in FIG. 11. By combining the processes in this way, erroneous detection during traveling around a curve can be prevented in a more reliable manner. The redefining of the axes may be performed not when the vehicle has stopped, but when the vehicle has begun to move. In that case, it is determined in S30 that the vehicle has begun to move, by detecting the vehicle speed, for example, by detecting that the vehicle speed has increased to 5 km/h or higher. Then, in S32, the axis whose output increased to 0.2 G or greater immediately after the vehicle began to move is identified as the axis oriented parallel to the traveling direction of the vehicle 1. Further, provisions may be made to reset the history information when power isturned on to the drive recorder 2 and to collect the information repeatedly after each power on.

Figure 13:
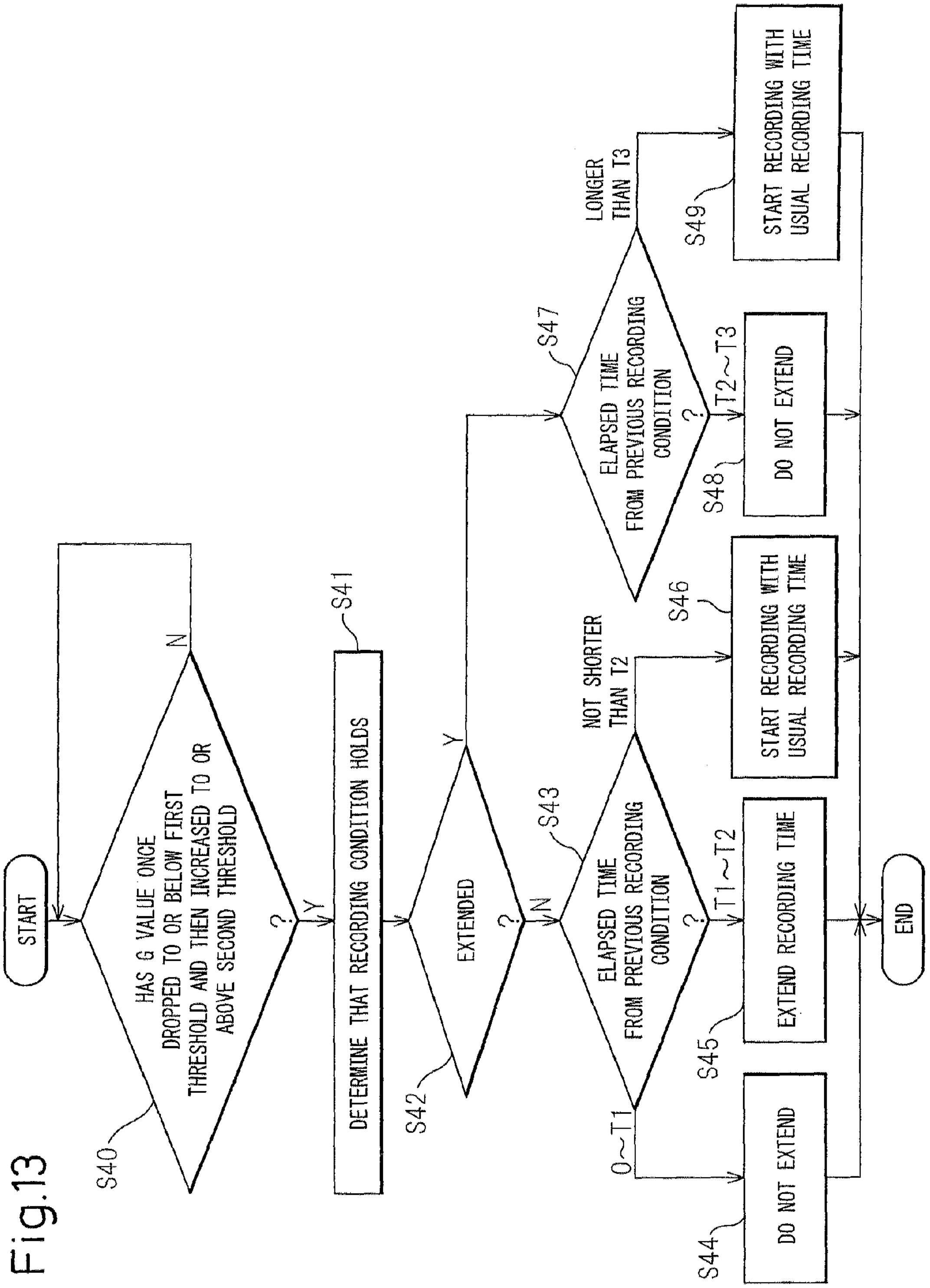
FIG. 13 is a process flow for G detection.

FIG. 13 is a process flow for the G detection that provides a criterion upon which to determine whether the recording condition holds or not.

First, the CPU 24 determines whether or not the G value detected in the process flow of FIG. 11 has once dropped to a value equal to or smaller than a first threshold (0.1 G) and then increased to a value equal to or larger than a second threshold (0.4 G) (S40) and, if the determination is affirmative, then it is determined that the recording condition related to the G detection holds (S41). The first threshold (0.1 G) and the second threshold (0.4 G) are values predetermined for the G detection. The reason that it is determined that the recording condition holds only when the G value has reached or exceeded the second threshold after once dropping to or below the first threshold is that, if values equal to or larger than the second threshold are detected repetitively, the situation could well be due, for example, to a failure of the acceleration sensor 5 or a rolling over of the vehicle 1, and in such cases, it would not be necessary to record the video information, etc., by determining that a new recording condition occurred.

Next, the CPU 24 determines whether or not the usual video information recording time (12 seconds before and 8 seconds after the occurrence of the recording condition) has been extended as will be described later (S42).

If, in S42, the recording time is not extended, the time elapsed from the occurrence of the previous recording condition is detected, and the process proceeds as follows according to the elapsed time (S43).

If, in S43, the time elapsed from the occurrence of the previous recording condition is longer than 0 second but shorter than T1 seconds (for example, 4 seconds), no new recording is initiated due to the occurrence of the current recording condition, nor is the video information recording time extended (S44). That is, the detection of the current recording condition is ignored. The reason is that the situation can be considered to be a series of events leading up to, for example, a collision after hard braking, and when the recording condition holds repetitively in too short a period, if the video information, etc., are recorded each time the recording condition holds, the same video information, etc., will be recorded repetitively in an overlapping fashion, which is not desirable.

If, in S43, the time elapsed from the occurrence of the previous recording condition is not shorter than T1 seconds (for example, 4 seconds) second but shorter than T2 seconds (for example, 8 seconds), the recording time is extended by a predetermined length of time (for example, 4 seconds) (S45). That is, if the recording condition holds a second time during the recording of the video information, more specifically, in the second half of the 8-second period after the occurrence of the previous recording condition, the recording time of the video information, etc., is extended, because if not extended, the amount of time to record the video information after the occurrence of the current recording condition would become too short. As a result, in the case of S45, the video information, etc., are recorded for a total of 24 seconds, i.e., 12 seconds before and 12 seconds after the occurrence of the recording condition.

If, in S43, the time elapsed from the occurrence of the previous recording condition is not shorter than T2 seconds (for example, 8 seconds), it is determined that a new recording condition holds, and the video information, etc., are recorded for 12 seconds before and 8 seconds after the occurrence of that recording condition (S46). As an exception to the above rule, when the recording condition holds for the first time after the startup of the drive recorder 2, the process proceeds to S46, and the video information, etc., are recorded for 12 seconds before and 8 seconds after the occurrence of that recording condition.

If it is determined in S42 that the recording time is already extended (S45), the process proceeds as follows by considering the time elapsed from the occurrence of the previous recording condition (S47).

If, in S47, the time elapsed from the occurrence of the previous recording condition is not shorter than T2 seconds (for example, 8 seconds) second but shorter than T3 seconds (for example, 12 seconds), the recording time is not re-extended (S48). That is, the detection of the current recording condition is ignored. The reason is that if the recording time were extended again, the video information, etc., for the same event would be recorded for too long a time.

If, in S47, the time elapsed from the occurrence of the previous recording condition is not shorter than T3 seconds (for example, 12 seconds), it is determined that a new recording condition holds, and the video information, etc., are recorded for 12 seconds before and 8 seconds after the occurrence of that recording condition (S49).

Specific examples of how the video information, etc. are recorded in accordance with the process flow of FIG. 13 will be described below with reference to FIGS. 14 to 17.

Figure 14A:
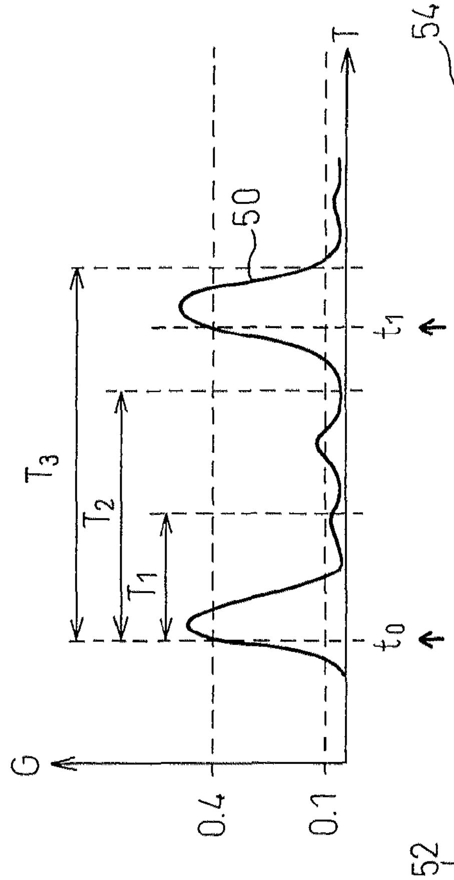
FIG. 14(*a*) is a diagram showing an example (1) of a graph of the G value 50 obtained in the process flow of FIG. 11, and FIG. 14(*b*) is a diagram showing video information being stored in a second RAM 15 in a continuously looping fashion and video information transferred for recording on a memory card 6.
Figure 14B:
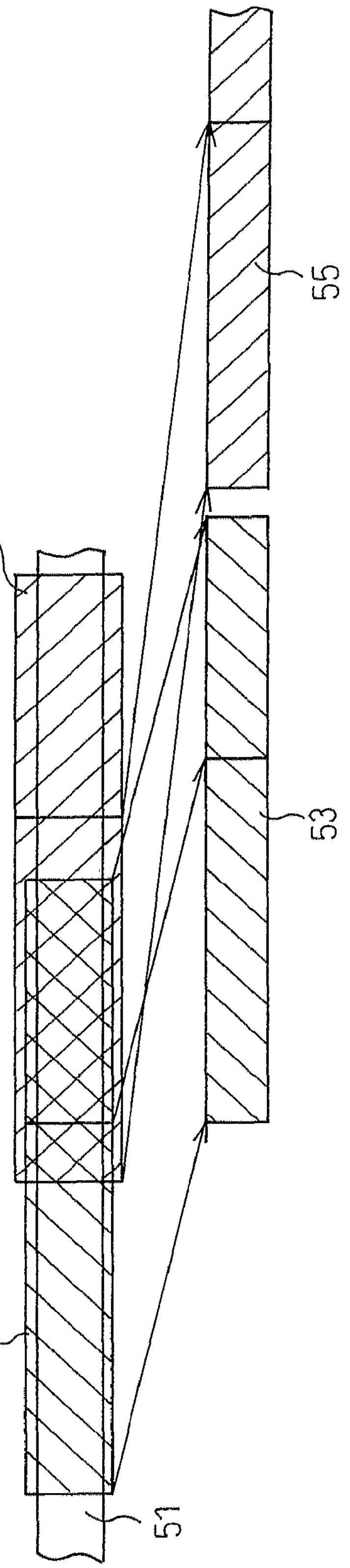

FIG. 14 is a diagram showing an example (1) of the video information recording based on the G detection. FIG. 14(*a*) shows a graph of the G value 50 obtained in the process flow of FIG. 11, and FIG. 14(*b*) is a diagram showing the video information being stored in the second RAM 15 in a continuously looping fashion and the video information transferred for recording on the memory card 6.

Suppose that the G value, after first dropping to or below the first threshold, increases to or above the second threshold at t0 and, thereafter, the G value drops again to or below the first threshold and then increases again to or above the second threshold at t1. The period from t0 to t1 is longer than T2 seconds.

Since the recording condition holds at t0, video information 52 for 12 seconds before and 8 seconds after t0 is recorded as one event 53 on the memory card 6 in accordance with S46 of FIG. 13. Next, since t1 occurs more than T2 seconds after t0, and since the recording time is not yet extended at the time of occurrence of t1, the recording condition holds at t1, and video information 54 for 12 seconds before and 8 seconds after t1 is recorded as another event 55 on the memory card 6 in accordance with S46 of FIG. 13. The video information recorded as the event 53 and the video information recorded as the event 55 partially overlap, as shown in FIG. 14(*b*).

Figure 15A:
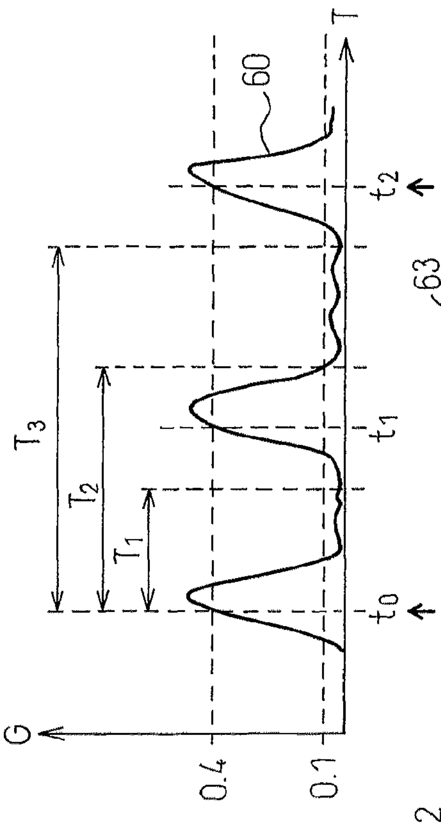
FIG. 15(*a*) is a diagram showing an example (2) of a graph of the G value 60 obtained in the process flow of FIG. 11, and FIG. 15(*b*) is a diagram showing video information being stored in the second RAM 15 in a continuously looping fashion and video information transferred for recording on the memory card 6.
Figure 15B:
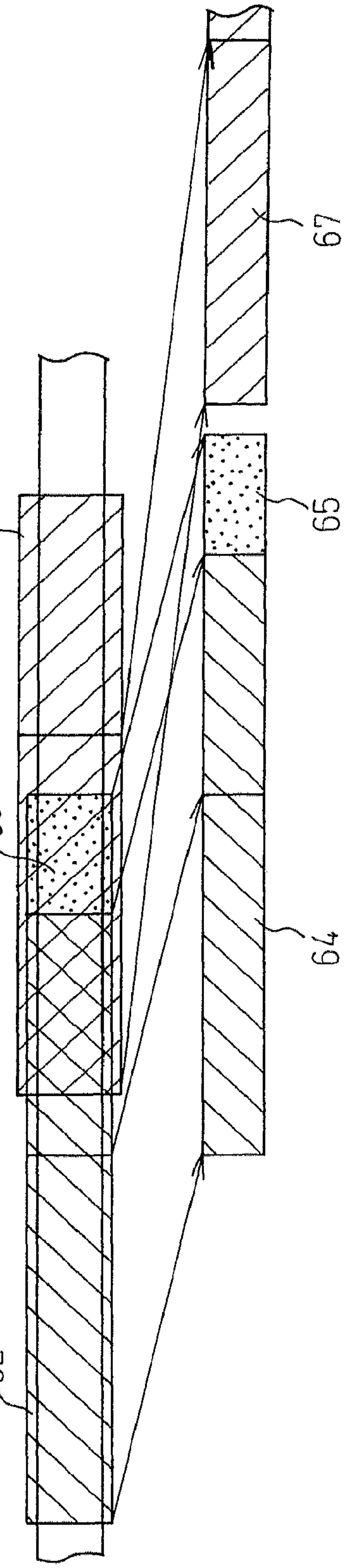

FIG. 15 is a diagram showing an example (2) of the video information recording based on the G detection. FIG. 15(*a*) is a diagram showing an example (2) of a graph of the G value 60 obtained in the process flow of FIG. 11, and FIG. 15(*b*) is a diagram showing the video information being stored in the second RAM 15 in a continuously looping fashion and the video information transferred for recording on the memory card 6.

Suppose that the G value, after first dropping to or below the first threshold, increases to or above the second threshold at t0 and, thereafter, the G value drops again to or below the first threshold and then increases again to or above the second threshold at t1, after which the G value once again drops to or below the first threshold and then increases once again to or above the second threshold at t2. The period from t0 to t1 is shorter than T2 seconds, and the period from t0 to t2 is longer than T3 seconds.

Since the recording condition holds at t0, video information 62 for 12 seconds before and 8 seconds after t0 is recorded as one event 64 on the memory card 6 in accordance with S46 of FIG. 13. Next, since t1 occurs less than T2 seconds after t0, and since the recording time is not yet extended at the time of occurrence of t1, the recording condition holds at t1, and video information 63 for 4 seconds is recorded as an extension 65 on the memory card 6 in accordance with S45 of FIG. 13. Further, at t2, since the recording time is already extended, and since t2 occurs more than T3 seconds after t0, the recording condition holds at t2, and video information 66, etc., for 12 seconds before and 8 seconds after t2 are recorded as another event 67 on the memory card 6 in accordance with S49 of FIG. 13. The video information recorded as the event 64 and the video information recorded as the event 67 partially overlap, as shown in FIG. 15(*b*).

Figures 16A, 16B:
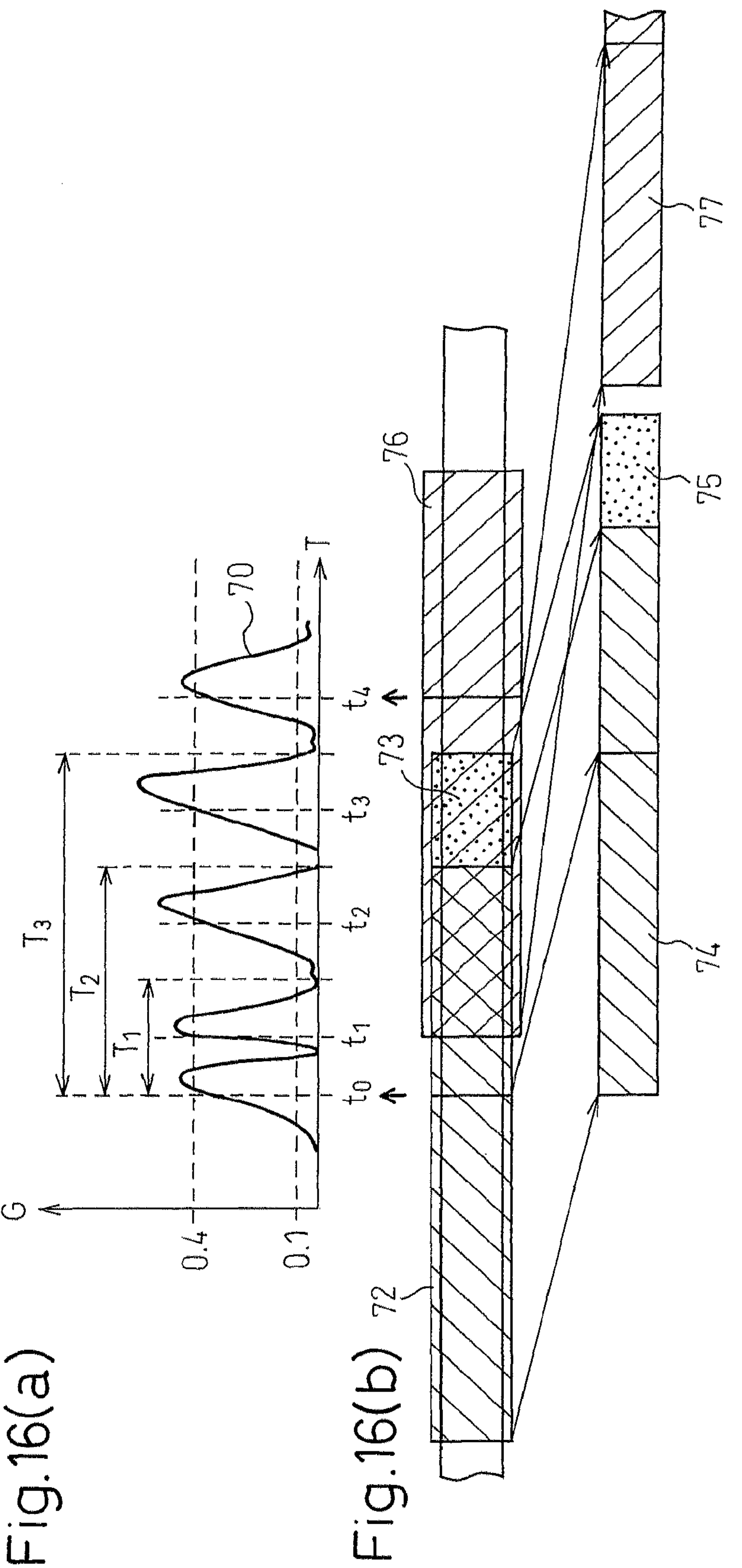
FIG. 16(*a*) is a diagram showing an example (3) of a graph of the G value 70 obtained in the process flow of FIG. 11, and FIG. 16(*b*) is a diagram showing video information being stored in the second RAM 15 in a continuously looping fashion and video information transferred for recording on the memory card 6.

FIG. 16 is a diagram showing an example (3) of the video information recording based on the G detection. FIG. 16(*a*) is a diagram showing an example (3) of a graph of the G value 70 obtained in the process flow of FIG. 11, and FIG. 16(*b*) is a diagram showing the video information being stored in the second RAM 15 in a continuously looping fashion and the video information transferred for recording on the memory card 6.

Suppose that the G value, after first dropping to or below the first threshold, increases to or above the second threshold at t0 and, thereafter, the G value drops again to or below the first threshold and then increases again to or above the second threshold at t1, then dropping and increasing in a similar manner at t2, t3, and t4, respectively. The period from t0 to t1 is shorter than T1 seconds, the period from t0 to t2 is shorter than T2 seconds, the period from t0 to t3 is shorter than T3 seconds, and the period from t0 to t4 is longer than T3 seconds.

Since the recording condition holds at t0, video information 72 for 12 seconds before and 8 seconds after t0 is recorded as one event 74 on the memory card 6 in accordance with S46 of FIG. 13. Since t1 is shorter than T1 seconds, the recording condition at t1 is ignored in accordance with S44 of FIG. 13. Next, since t2 occurs less than T2 seconds after t0, and since the recording time is not yet extended at the time of occurrence of t2, the recording condition holds at t2, and video information 73 for 4 seconds is recorded as an extension 75 on the memory card 6 in accordance with S45 of FIG. 13. At t3, since the recording time is already extended, and since t3 occurs less than T3 seconds after t0, the recording condition at t3 is ignored in accordance with S48 of FIG. 13. Further, at t4, since the recording time is already extended, and since t4 occurs more than T3 seconds after t0, the recording condition holds at t4, and video information 76 for 12 seconds before and 8 seconds after t4 is recorded as another event 77 on the memory card 6 in accordance with S49 of FIG. 13. The video information recorded as the event 74 and the video information recorded as the event 77 partially overlap, as shown in FIG. 16(*b*).

Figures 17A, 17B:
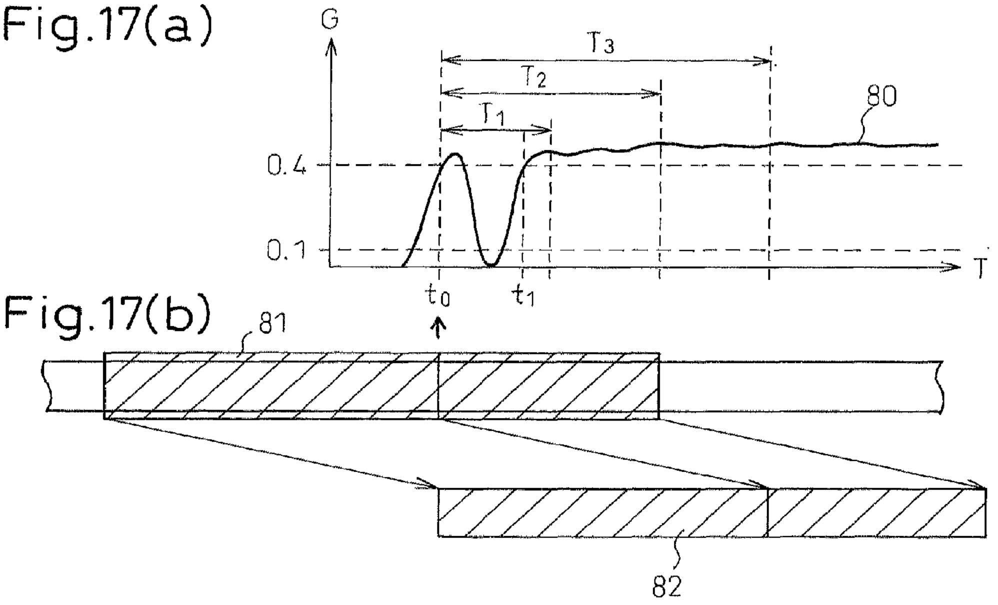
FIG. 17(*a*) is a diagram showing an example (4) of a graph of the G value 80 obtained in the process flow of FIG. 11, and FIG. 17(*b*) is a diagram showing video information being stored in the second RAM 15 in a continuously looping fashion and video information transferred for recording on the memory card 6.

FIG. 17 is a diagram showing an example (4) of the video information recording based on the G detection. FIG. 17(*a*) is a diagram showing an example (4) of a graph of the G value 80 obtained in the process flow of FIG. 11, and FIG. 17(*b*) is a diagram showing the video information being stored in the second RAM 15 in a continuously looping fashion and the video information transferred for recording on the memory card 6.

Suppose that the G value, after first dropping to or below the first threshold, increases to or above the second threshold at t0, and thereafter, the G value drops again to or below the first threshold and then increases again to or above the second threshold at t1, the G value then continuing to remain above the second threshold.

Since the recording condition holds at t0, video information 81, etc., for 12 seconds before and 8 seconds after t0 are recorded as one event 82 on the memory card 6 in accordance with S46 of FIG. 13. Since t1 is shorter than T1 seconds, the recording condition at t1 is ignored in accordance with S44 of FIG. 13. Further, since thereafter the G value does not drop to or below the first threshold, if a G value equal to or greater than the second threshold is detected, it is determined in S40 of FIG. 13 that the recording condition does not hold. The example of FIG. 17 corresponds, for example, to a situation where the driver applied hard braking at t0 but was unable to avoid a collision, and the vehicle 1 rolled over at t1, the acceleration sensor 5 thereafter continuing to output high G values due to the rolling over of the vehicle.

As described above with reference to FIGS. 13 to 17, when a G value equal to or greater than a predetermined threshold is detected, if the recording condition holds repetitively, or if such high G values are detected repetitively, control is performed so as not to record unnecessary video information; this serves to make efficient use of the memory card 6 having a limited capacity.

The voltage drop processing of the drive recorder 2 will be described with reference to FIGS. 18 to 20.

The voltage drop processing refers to the processing performed to properly protect video information being recorded, etc., in such cases as when the output voltage of the battery 21 has dropped due to, for example, the damage caused by an accident of the vehicle 1, or the like.

Figure 18:
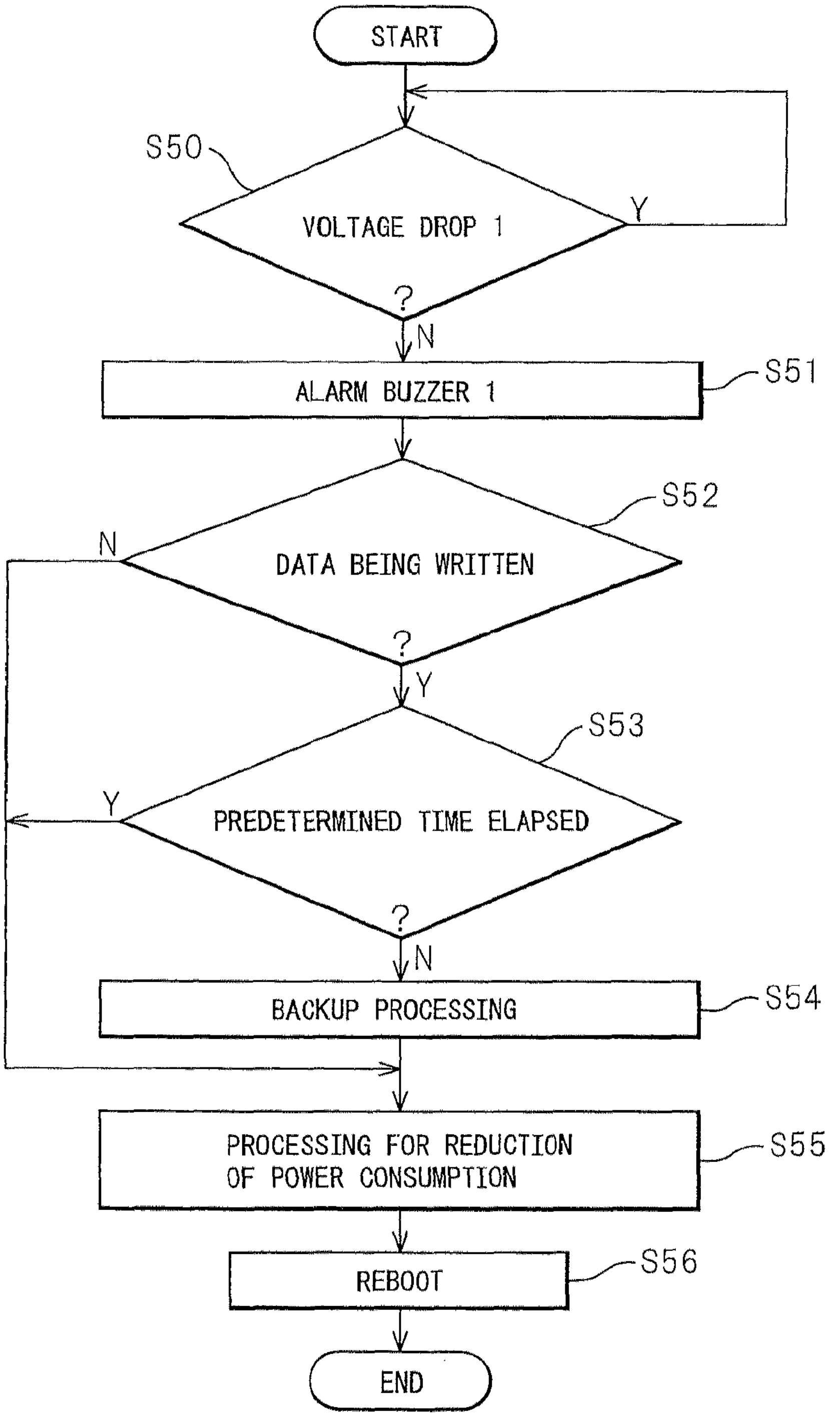
FIG. 18 is a diagram showing a voltage drop process flow (1).

FIG. 18 is a diagram showing a voltage drop process flow (1).

The CPU 24 constantly monitors the output of the first detector 43 (see FIG. 6) to detect a H to L transition of the first voltage drop signal S1 (S50). As earlier described with reference to FIG. 6, if the output voltage of the battery 21 drops to 8.0 V or below, the first detector 43 sets the first voltage drop signal S1 from H to L.

If, in S50, the first voltage drop signal S1 changes from H to L, the CPU 24 causes the buzzer 26 to sound an alarm (S51).

Next, the CPU 24 determines whether the recording condition currently holds and video information, etc., are in the process of being written to the memory card 6 (S52), and also determines whether a predetermined time (for example, 8 seconds) had elapsed from the occurrence of the recording condition when the first voltage drop signal S1 was detected in S50 (S53).

If the video information is currently being written, and if the predetermined time had not elapsed from the occurrence of the recording condition, the writing to the memory card is suspended, and the video information acquired for the 10 seconds preceding the occurrence of the trigger is recorded. In this case, the number of frames to be recorded is reduced. That is, the video information acquired for the 10 seconds preceding the detection of the first voltage drop signal is written to the memory card 6 at a rate of 5 frames per second (compared with the usual rate of 10 frames per second) by creating a special backup folder (S54). When the first voltage drop signal is detected, since it is highly likely that the drive recorder is unable to acquire new video information thereafter, control is performed to minimize the loss of information by saving the video information acquired up to that moment in the special backup folder. It is preferable to also save the vehicle operational information in the special backup folder together with the video information.

If it is determined in S53 that the predetermined time had elapsed, no special backup processing is performed. The reason is that since, in this case, the video information for the usual recording time (12 seconds before and 8 seconds after the occurrence of the recording condition) is already acquired, it is considered that the video information can be recorded on the memory card 6 in the usual way.

After that, processing is performed to reduce power consumption by cutting off power to the first camera 3, the second camera 4, the JPEG-IC constituting the image processing circuit 13, and the GPS receiver 9, thereby reserving power for writing the video information 6 to the memory card 6 (S55). Power for the backup processing in S54 is supplied from the backup battery 46.

After completing the backup processing, the CPU 24 stops watchdog timer, and reboots itself (S56) to terminate the sequence of operations.

Figure 19:
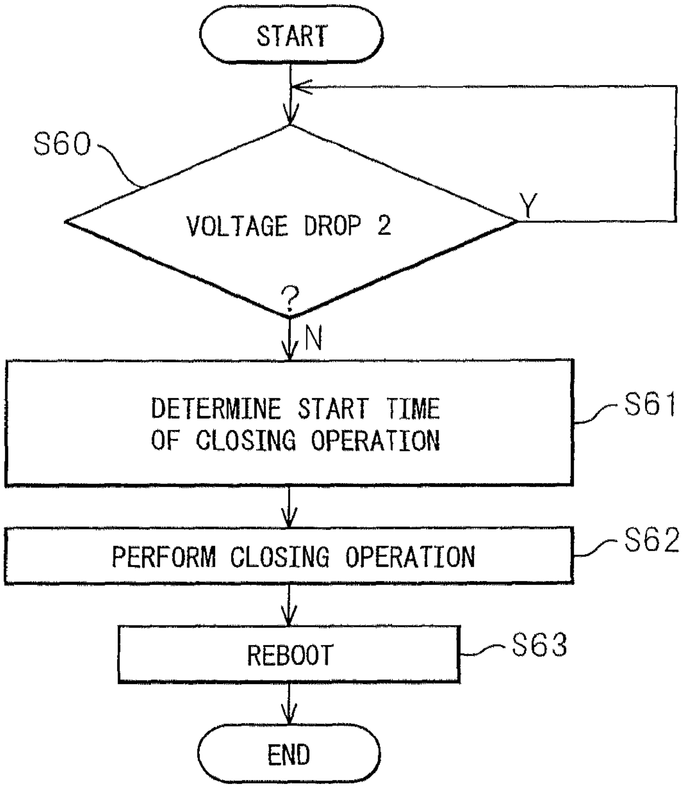
FIG. 19 is a diagram showing a voltage drop process flow (2).

FIG. 19 is a diagram showing a voltage drop process flow (2).

The CPU 24 constantly monitors the output of the second detector 44 (see FIG. 6) to detect a H to L transition of the second voltage drop signal S2 (S60). As earlier described with reference to FIG. 6, if the output voltage of the first power supply circuit 40 (or the output voltage of the backup battery 46) drops to 3.7 V or below, the second detector 44 sets the second voltage drop signal S2 from H to L.

If, in S60, the second voltage drop signal S2 changes from H to L, the CPU 24 determines the start time of a closing operation (S61).

Figure 20:
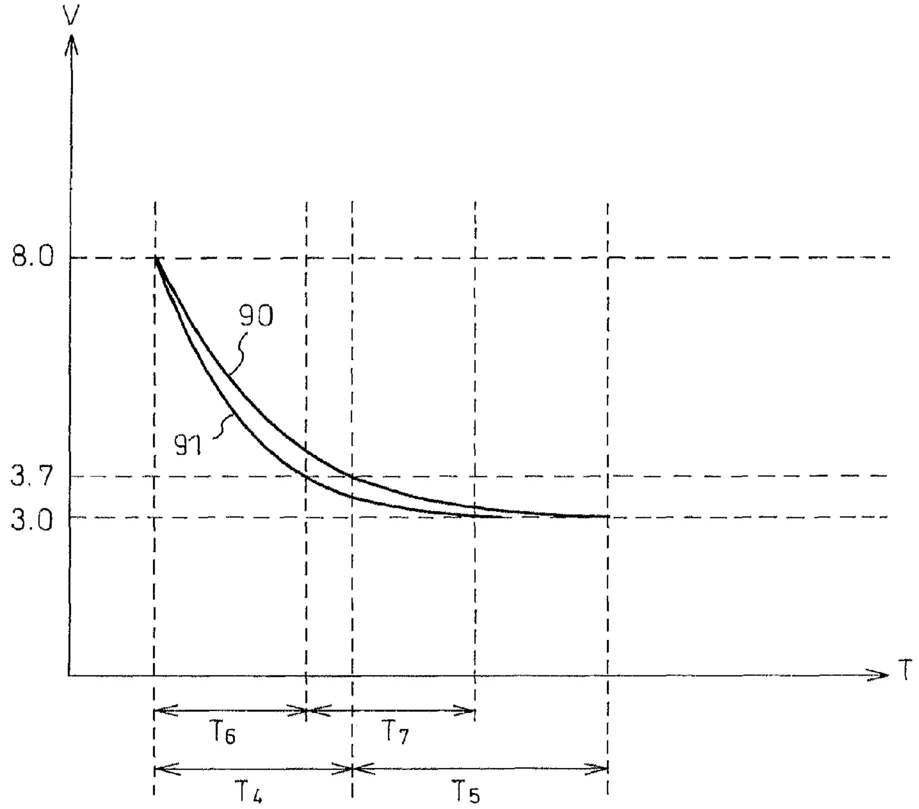
FIG. 20 is a diagram showing voltage drops.

FIG. 20 is a diagram showing voltage drops. Curve 90 in FIG. 20 shows the case where it took T4 seconds for the voltage to drop from 8.0 V to 3.7 V (the time from the detection of the first voltage drop to the detection of the second voltage drop) and T5 seconds for the voltage to drop from 3.7 V to 3.0 V (the time from the detection of the second voltage drop to the output of the reset signal), and curve 91 in FIG. 20 shows the case where it took T6 seconds for the voltage to drop from 8.0 V to 3.7 V and T7 seconds for the voltage to drop from 3.7 V to 3.0 V. Since the reset signal for preventing the erroneous operation of the CPU 24, etc., is output from the third detector 45 when the voltage drops to 3.0 V, it is important to estimate the time left after the detection of the second voltage drop until the reset voltage is output. As shown in FIG. 20, the time left after the detection of the second voltage drop until the reset voltage is output can be roughly estimated based on the time taken from the detection of the first voltage drop to the detection of the second voltage drop. It should be noted here that the closing operation takes about 500 ms to complete.

In view of the above, if the time taken for the voltage to drop from 8.0 V to 3.7 V is one second or longer, since some time is left until the reset signal occurs, the closing operation is started one second after the detection of the second voltage drop; on the other hand, if the time taken for the voltage to drop from 8.0 V to 3.7 V is less than one second, since the reset signal is highly likely to occur early, the closing operation is started immediately after the detection of the second voltage drop. The above time setting is only illustrative and not restrictive.

Next, the CPU 24 starts the closing operation (S62) at the start time determined in S61. The closing operation refers to the operation performed to close all of the currently opened files, thereby completing the writing of the video information to the memory card 6. After the closing operation, writing to the memory card is prohibited. If the closing operation is not carried out properly, the video information recorded in the files may become unable to be used properly at a later time; therefore, even when the backup processing shown in FIG. 18 is in progress, the closing operation is performed by interrupting the backup processing.

After completing the closing operation, the CPU 24 stops watchdog timer, and reboots itself (S63) to terminate the sequence of operations.

By properly performing the voltage drop processing shown in FIGS. 18 to 20, as much of the video information, etc., as possible can be recorded on the memory card 6 even when the battery 21 is damaged or the connection between the drive recorder 2 and the battery 21 is broken due to a vehicle accident or the like.

Figure 21:
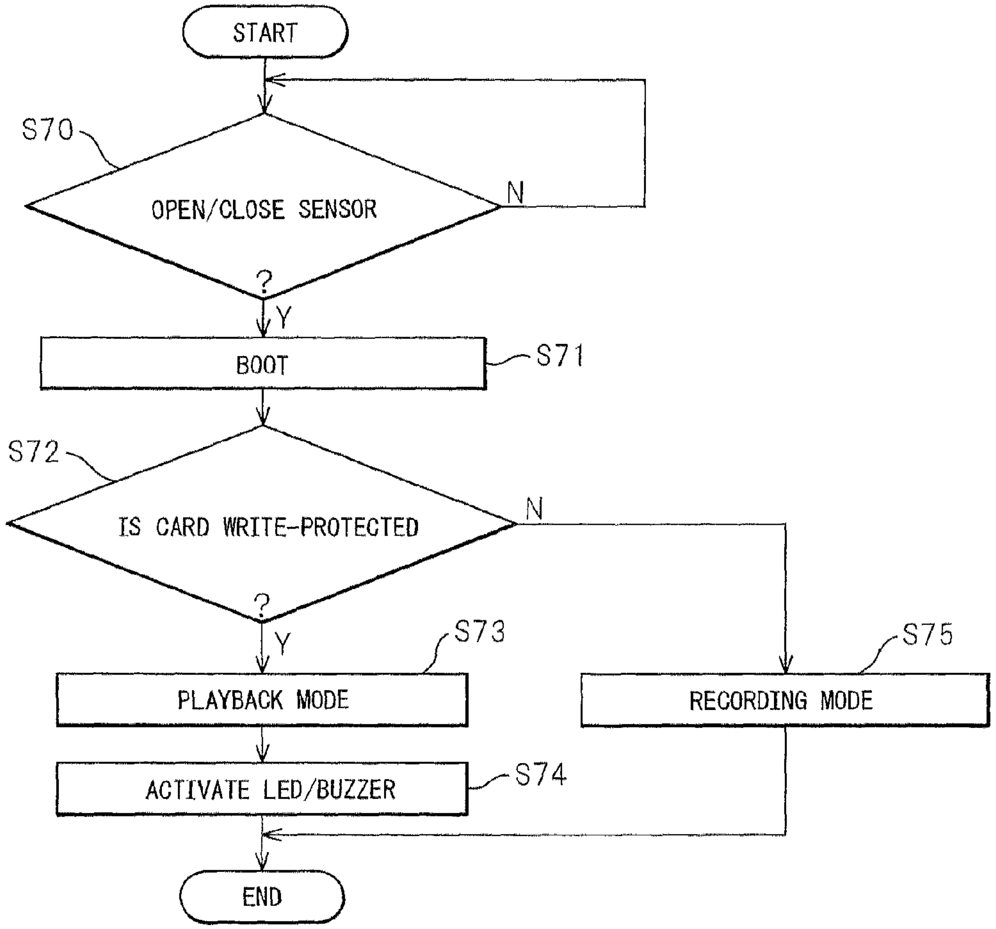
FIG. 21 is a diagram showing a mode switching flow.

FIG. 21 is a diagram showing a mode switching flow.

The drive recorder 2 has an output port for connecting to the display unit 30, and is constructed so that in the event of an accident or the like, the contents recorded on the memory card can be examined on the spot. That is, the drive recorder 2 of the present invention has a recording mode for recording the video information, etc., on the memory card 6 and a playback mode for playing back the video information recorded on the memory card 6. The recording mode/playback mode switching flow will be described with reference to FIG. 21.

First, when the open/close sensor 27 detects that the open/close knob 31 on the drive recorder 2 is set to the open position (S70), the CPU 24 starts up a boot program for initializing the drive recorder 2 (S71).

Next, after checking that the memory card 6 is inserted in the I/F 11 and that the memory card 6 is write-protected (S72), the CPU 24 loads a playback mode program from the nonvolatile ROM, and executes the program to operate the drive recorder 2 in the playback mode (S73). When the memory card 6 is write-protected, the port associated with one of the connecting terminals of the memory card 6 produces a specific output; therefore, the CPU 24 can check, via the I/F 11, whether the memory card 6 is write-protected or not.

Next, the CPU 24 activates the LED 25 and/or buzzer 26 to indicate that the drive recorder 2 is operating in the playback mode (S74), and the sequence of operations is terminated.

On the other hand, if, in S72, the memory card 6 is inserted in the I/F 11, but the memory card 6 is not write-protected, the CPU 24 loads a recording mode program from the nonvolatile ROM, and executes the program to operate the drive recorder 2 in the recording mode (S75).

That is, usually, the memory card 6 set to a write-unprotected state is inserted in the drive recorder 2, and the mode is set to the recording mode; in this condition, video information, etc., are recorded each time the recording condition holds as earlier described. In the event of an accident or the like, if the user desires to check the recorded contents on the spot, the user removes the memory card 6 and sets its switch to the write-protection position; then, the memory card 6 is inserted in the drive recorder 2, whereupon the mode is changed to the playback mode so that the video information recorded on the memory card 6 can be played back. If the drive recorder 2 is not connected to the display unit 30, or if the display unit 30 is damaged, for example, a portable display device may be connected to the output slot of the drive recorder 2. The playback mode setting method is not limited to the above one. Various other methods are possible, one possible method being such that if the image capture switch 8 is operated in a predetermined manner within a predetermined time after power on, the mode is set to the playback mode, but if it is not operated in the predetermined manner, the mode is set to the recording mode.

Next, a description will be given of how the video information is played back in the playback mode.

After the LED 25 and buzzer 26 are activated in S74 of FIG. 21 to indicate that the drive recorder 2 is operating in the playback mode, if the user presses the image capture switch 8, the buzzer 26 stops and the playback of the most recently recorded event starts. Suppose that 15 events are recorded on the memory card 6; then, the playback of the most recent 15th event starts, and usually (if the recording time is not extended) 20 seconds of recorded video information will be displayed on the display unit 30. It is preferable that at least the event number indicating which event the video information concerns and the time at which the recording condition occurred are displayed on the display unit 30 along with the video information.

When the image capture switch 8 is pressed again during the playback of the video information concerning the event, the playback stops. With the playback thus stopped, if the image capture switch 8 is pressed once again, the playback resumes from the point one second before the point at which the playback was stopped. After the playback of the video information concerning one event is completed, the same playback mode is maintained, and when the image capture switch 8 is pressed again, the video information concerning the same event is played back over again. If the image capture switch 8 is pressed and held down, the playback of the video information concerning the next event, i.e., the event recorded before the current event, starts. By pressing and holding down the image capture switch 8, all the video information recorded on the memory card 6 can be played back, one event after another. The above has described one method devised to make effective use of the image capture switch 8 which is the only one operating means provided on the drive recorder 2, but it will be appreciated that an additional operating means may be provided on the drive recorder 2.

If the image capture switch is not operated within a predetermined time (for example, at least 30 seconds) after the playback mode is entered, it is preferable for the CPU 24 to reboot itself (see S71) and start up the process once again. In this case, by sounding the playback mode buzzer after restarting, an audible warning can be issued prompting the user to release the playback mode.

Figure 22:
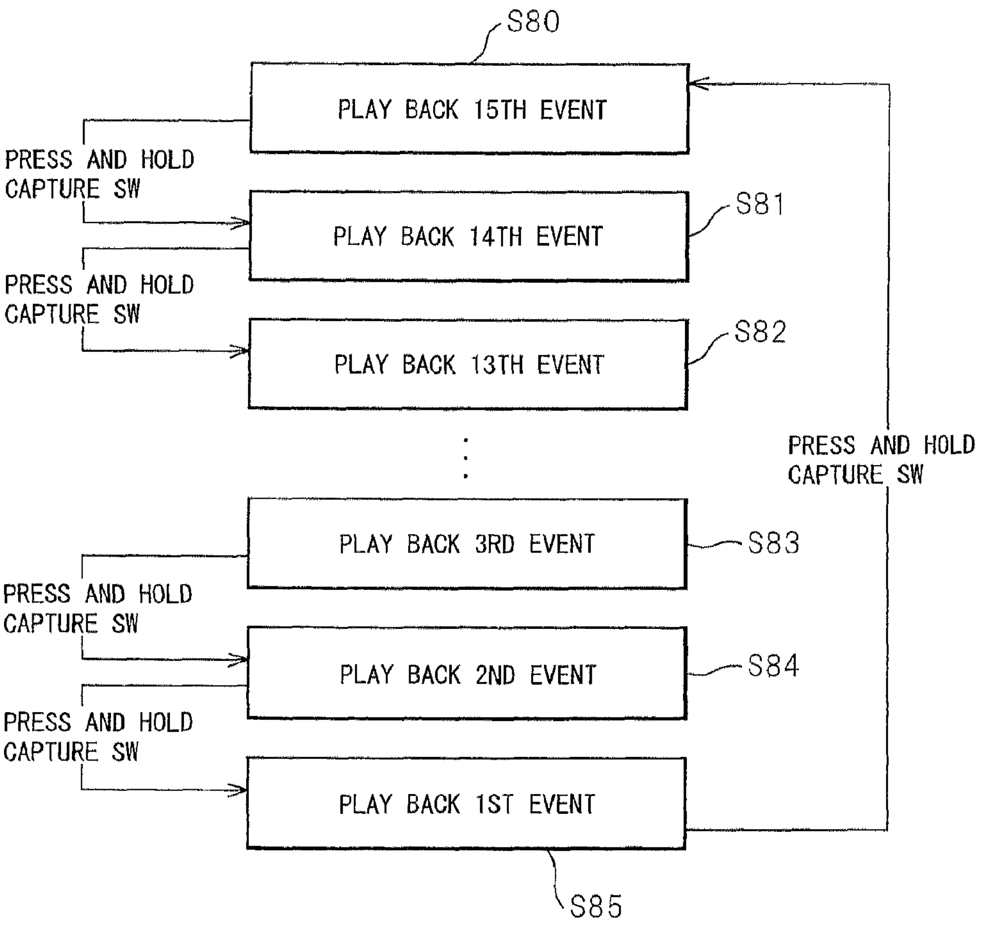
FIG. 22 is a diagram showing a playback sequence.

FIG. 22 is a diagram showing a playback sequence. As shown in FIG. 22, by pressing and holding down the image capture switch 8, control can be performed to play back the recorded events one after another, starting from the most recently recorded 15th event (S80) and progressing toward the first recorded event (S85). If the image capture switch 8 is pressed and held down during the playback of the first event, the playback of the 15th event starts.

Next, a description will be given of how the memory card 6 is used with the playback apparatus 400.

Figures 23, 24:
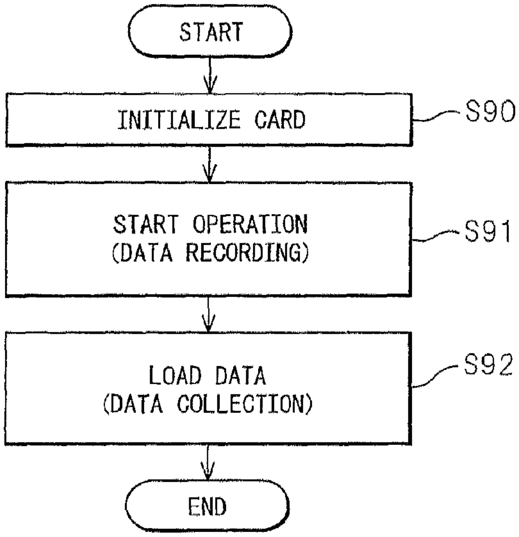
FIG. 23 is a diagram showing an example of the operation flow of the memory card 6.
FIG. 24 is a diagram showing a mapping table for field of vision ranges.

FIG. 23 is a diagram showing an example of the operation flow of the memory card 6.

First, the user sets the memory card 6 to a write-unprotected state, and inserts it into the I/F 411 of the playback apparatus 400 to initialize the card (S90). In the initialization of the card, the CPU 424 erases the data, etc., recorded on the memory card 6 and writes the ID of the user (for example, a taxi driver) of the memory card 6 to a predetermined address in the memory card 6.

Next, when the user starts the operation of the vehicle 1 (for example, when the taxi driver as the user starts his duty for the day (07:45 to 17:15)), the user inserts the initialized and write-protected memory card 6 into the I/F 11 of the drive recorder 2 installed in the vehicle 1, and sets the drive recorder 2 to the recording mode to start data recording (S91). As previously described, each time the recording condition holds, the CPU 24 records on the memory card 6 the video information and vehicle operational information captured for a predetermined period of time (for example, 20 seconds).

Next, at the end of the operation of the vehicle 1 (for example, when the taxi driver ends his duty for the day), the user removes the memory card 6, on which data has been recorded, from the I/F 11 of the drive recorder 2. Then, the user inserts the memory card 6 into the I/F 411 of the playback apparatus 400, and loads the video information, vehicle operational information, memory card ID, user ID, etc., recorded on the memory card 6 into the playback apparatus 400 (S92).

The video information, vehicle operational information, memory card ID, and user ID recorded on the memory card 6 are loaded into the playback apparatus 400 on a per-duty and per-vehicle basis under the control of the CPU 424. In the playback apparatus 400, not only can the data recorded on each memory card be analyzed on an individual basis, but after loading data from different memory cards 6 used to record the operations of different vehicles, the data can be analyzed in a collective manner. Further, the same memory card 6 may be used for different vehicles or for recording the operations of the same vehicle over more than one duty.

Next, a description will be given of the field of vision area to be displayed on the playback apparatus 400.

The drive recorder 2 acquires video information using the first and second cameras 3 and 4, but the field of vision with which the driver actually sees the surroundings is different from the field of vision that each camera has.

The field of vision of a human is the range in which a human can see without moving his eyes, and generally, when the vehicle 1 is stationary, the field of human vision with two eyes is about 200 degrees horizontally and about 112 degrees vertically. As the speed of the vehicle 1 increases, the driver's eyes tend to focus on objects farther ahead, causing near objects to appear blurred, and the field of vision of the driver thus decreases. Further, since the field of vision tends to decrease with age, the field of vision of an elderly driver is not the same as that of a younger driver. Generally, the field of vision of elderly people (for example, 60 years or older) is narrower than that of younger people (for example, younger than 60 years). As an example, it can be considered that the field of vision is narrower by 20%. FIG. 24 is a diagram showing a mapping table that provides a mapping between the speed of the vehicle 1 and the horizontal and vertical fields of vision as used in the playback apparatus 400. The area defined by the horizontal and vertical fields of vision, i.e., the range that the driver can see without moving his eyes, will be referred to as the field of vision area.

In the playback apparatus 400, when playing back the video information acquired by the drive recorder, the field of vision range in which the driver actually sees the surroundings is identified to help to investigate how an accident or the like can occur. By thus identifying the field of vision range, it also becomes possible to use the video for safe driving education of drivers.

The playback apparatus 400 is constructed so that when displaying the video information concerning any particular event on the display unit 440, the playback apparatus 400 can detect the vehicle speed from the vehicle speed data in the vehicle operational information, obtain the corresponding field of vision angles from the mapping table shown in FIG. 24 (the mapping table is stored in the playback apparatus 400), and display the field of vision range on the screen under the control of the CPU 424 in accordance with the control program 417.

The playback apparatus 400 provides the following five field-of-vision-range playback modes so that by operating the operation unit 430, the user can select one of the modes to playback the video information.

1. Fixed angle mode: Displays only the field of vision range that corresponds to the horizontal and vertical field of vision angles specified by the operation unit 430.

2. Instantaneous vehicle speed mode: Displays only the field of vision range that corresponds to the horizontal and vertical field of vision angles corresponding to the vehicle speed detected at the instant that the recording condition occurred.

3. Playback image-based vehicle speed mode: Sequentially displays the field of vision ranges that correspond to the horizontal and vertical field of vision angles corresponding to the vehicle speeds applicable to sequentially presented still images.

4. Fixed vehicle speed mode: Displays only the field of vision range that corresponds to the horizontal and vertical field of vision angles corresponding to the vehicle speed specified by the operation unit 430.

5. Normal mode: Does not display the field of vision range.

In the instantaneous vehicle speed mode (2), playback image-based vehicle speed mode (3), and fixed vehicle speed mode (4), the field of vision angles can be corrected for the elderly.

Figure 25:
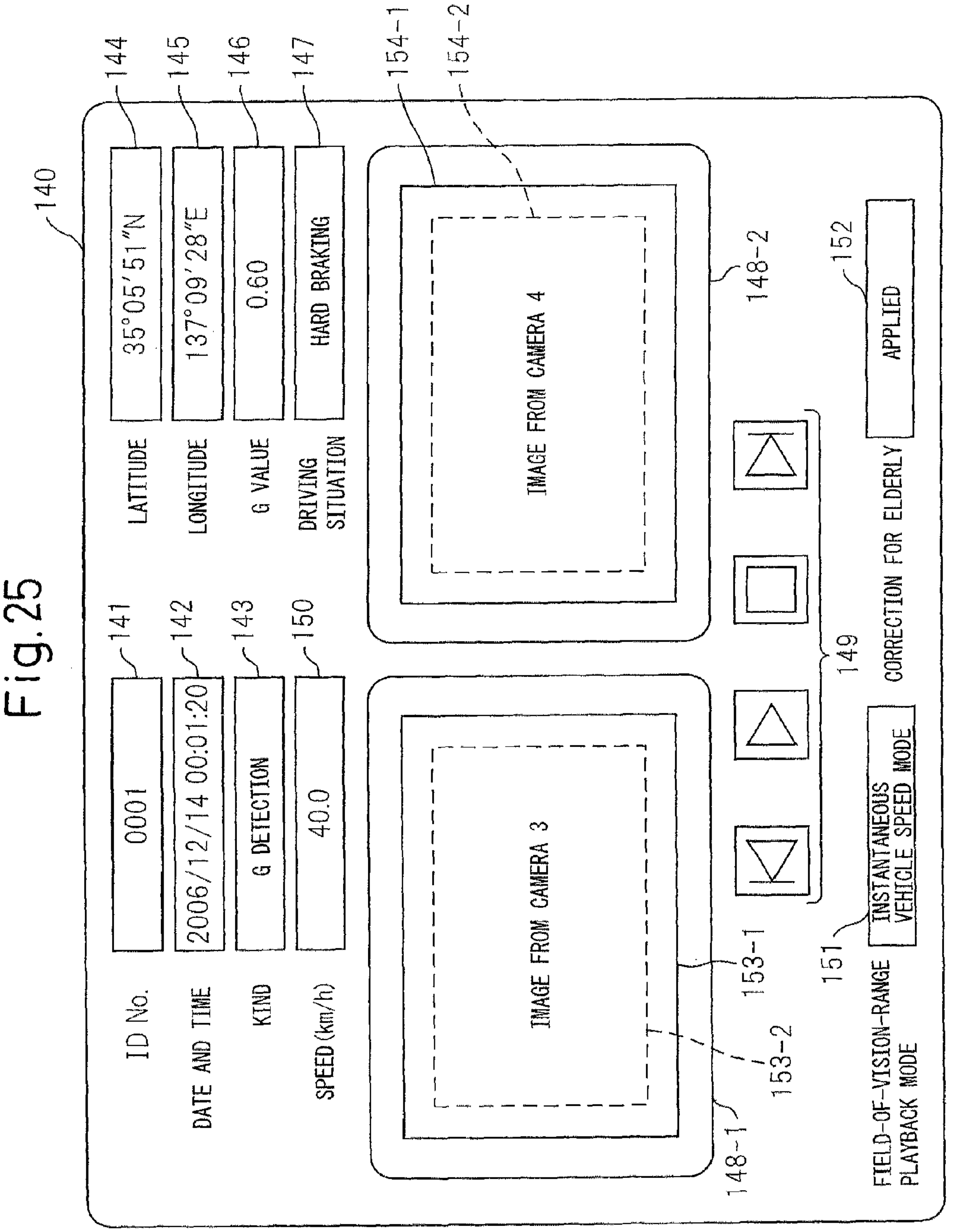
FIG. 25 is a diagram showing an example of a screen for displaying video information.

FIG. 25 is a diagram showing an example of a screen for displaying the video information recorded on the memory card 6. The screen of FIG. 25 and any operation that the user performs on the screen are displayed on the display unit 440 under the control of the CPU 424 in accordance with the control program 417 and based on the data stored on the card information recording unit 460.

As shown in FIG. 25, the screen 140 presented on the display unit 440 displays ID number data 141 of the memory card 6, time information 142 contained in the vehicle operational information, kind information 143 indicating the kind of the recording condition that occurred, latitude information 144 contained in the position information, longitude information 145 contained in the position information, G value 146 obtained in accordance with the flow of FIG. 11, driving situation information 147 to be described later that indicates the driving situation when the presented still image was captured, an area 148-1 in which still images captured by the first camera 3 are sequentially displayed, an area 148-2 in which still images captured by the second camera 4 are sequentially displayed, operation buttons 149 (rewind, playback, stop, fast forward) for controlling the display of the still images captured by the first camera 3 and second camera 4, vehicle speed information 150 indicating the vehicle speed detected when the presented still image was captured, an area 151 for displaying the selected field-of-vision-range playback mode, and an area 152 for displaying whether correction for the elderly is applied or not.

The area 148-1 displays a first frame 153-1 defining the field of vision range and a second frame 153-2 defining the field of vision range corrected for the elderly. Likewise, the area 148-2 displays a first frame 154-1 defining the field of vision range and a second frame 154-2 defining the field of vision range corrected for the elderly. In the example of FIG. 25, the area 152 indicates that correction for the elderly is applied, but when correction for the elderly is not applied, the second frames 153-2 and 154-2 are not displayed. The field of vision ranges can be displayed clearly by displaying the areas outside the first and second frames differently than the areas inside the respective frames.

In the example of FIG. 25, since the instantaneous vehicle speed mode is selected as indicated in the area 151, the field of vision area defined by the horizontal field of vision angle (140 degrees) and vertical field of vision angle (78 degrees) corresponding to the vehicle speed (for example, 40 km/h) detected at the instant that the recording condition occurred (see FIG. 24) is shown by the first frame 153-1 within the area 148-1. Further, the field of vision area defined by the horizontal field of vision angle (112 degrees) and vertical field of vision angle (63 degrees), corrected for the elderly, corresponding to the vehicle speed (for example, 40 km/h) detected at the instant that the recording condition occurred (see FIG. 24) is shown by the second frame 153-2 within the area 148-1. The field of vision areas are likewise shown within the area 148-2.

On the screen 140 shown in FIG. 25, 100 still images captured for 10 seconds by the first camera 3 and 100 still images captured for 10 seconds by the second camera 4 are sequentially displayed on the respective display areas 148-1 and 148-2 under the control of the operation buttons 149 operated by the user. At the same time, the various pieces of information associated with the displayed still images are displayed in the display/input areas 141 to 147 and 150. The screen 140 shown in FIG. 25 is only one example, and any other suitable screen design may be employed.

In the present embodiment, since the field of vision area is displayed in a superimposing fashion on the video information recorded on the memory card 6, the video information acquired by the drive recorder can be checked by discriminating between the area that actually corresponds to the driver's field of vision range and the area that corresponds to the camera's field of vision range. Further, by correcting the field of vision range according to age, the driver's field of vision range can be brought further closer to that in the actual situation.

In FIG. 25, the recording condition and the video information are displayed on the same screen, but they need not necessarily be displayed on the same screen; for example, an operation button for displaying the recording condition may be displayed on the same screen as the image, with provisions made to display the recording condition in a separate window by operating the operation button.

Figure 26:
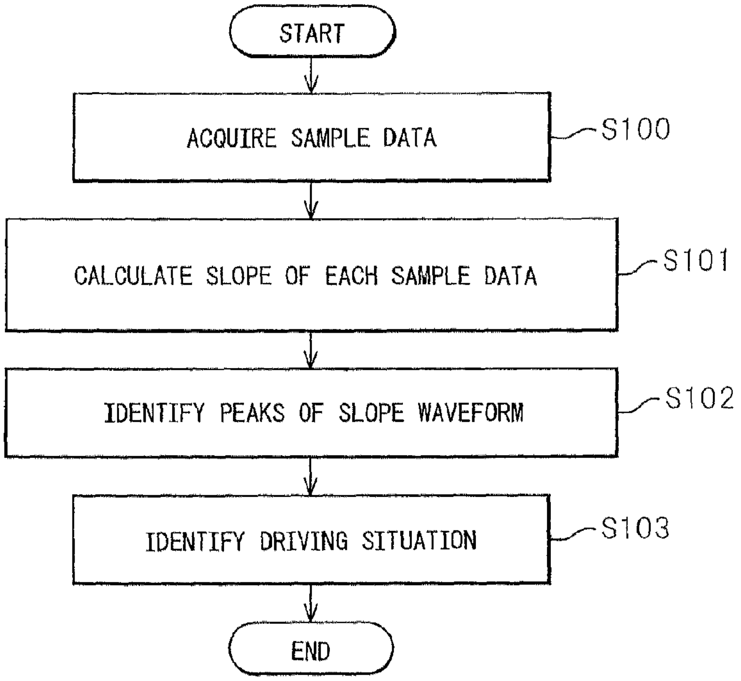
FIG. 26 is a diagram showing a process flow for identifying a driving situation.

FIG. 26 is a diagram showing a process flow for identifying the driving situation.

As described earlier, the video information, etc. concerning each event that triggered the recording condition are recorded on the memory card 6. However, when checking the recorded video information, etc., by displaying them on the playback apparatus 400, it is important to identify the driving situation that triggered the recording condition. In view of this, the playback apparatus 400 has the function of automatically identifying each event in accordance with the process flow of FIG. 26 by using the recorded video information and vehicle operational information.

The driving situations to be identified here are classified into the following five categories: "abrupt starting," "hard braking," "normal braking," "abrupt left turn steering," and "abrupt right turn steering."

First, the CPU 424 selects a particular event, and acquires as sample data the G1 value (the output of the axis of the acceleration sensor 5 in the direction parallel to the longitudinal direction of the vehicle 1), G2 value (the output of the axis of the acceleration sensor 5 in the direction parallel to the transverse direction of the vehicle 1), and vehicle speed data for each of the 30 still images captured before and after the occurrence of the recording condition (S100).

Next, for each sample, the CPU 424 calculates the slope of change in the sample by applying the method of least squares to the values at 10 points before and after that sample (S101). Then, for each sample sequence, the CPU 424 identifies the peaks of the slope waveform before and after the occurrence of the recording condition (S102).

Next, by matching the peaks obtained in S102 against a peak master file for identifying each predetermined driving situation to be described later, the CPU 424 identifies the driving situation for the particular event (S103), after which the sequence of operations is terminated. The driving situation identified for each particular event is displayed (in the area 147 of FIG. 25) on the display unit 440 when displaying the video information related to that event. Further, an icon representing the identified driving situation is displayed in a superimposing fashion on the image, for example, in the upper right corner of the image. This enables the user to properly recognize the driving situation for the event being played back. Further, since the events can be searched based on the category of the driving situation, the search range can be narrowed. In this way, only the driving situation that the user desires to check can be extracted and the associated images played back.

Figure 27:
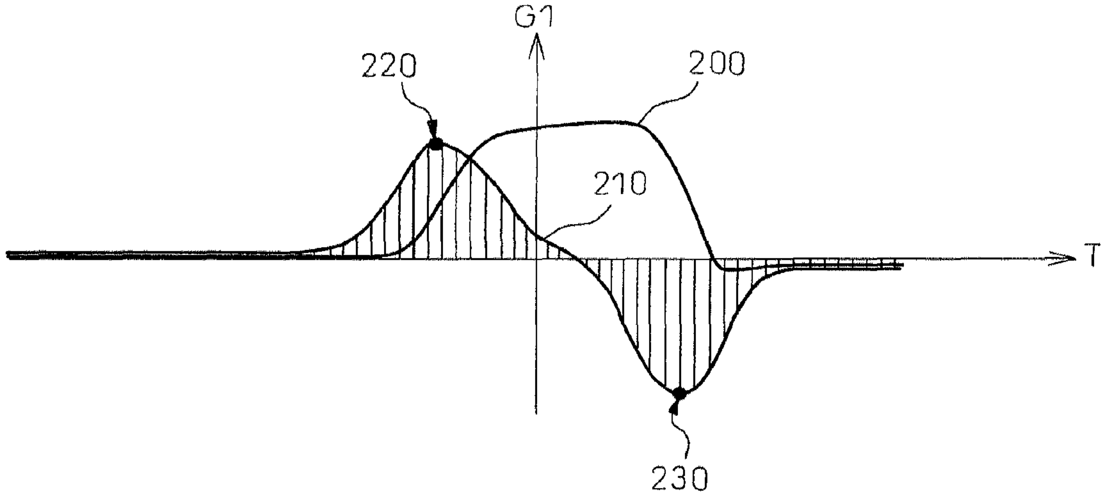
FIG. 27 is a diagram showing a sample sequence, etc.

FIG. 27 is a diagram showing a sample sequence, etc. The ordinate represents the G1 value and the abscissa the time, and t=0 corresponds to the time at which the recording condition occurred.

FIG. 27 shows the sample sequence 200 representing the samples of the G1 value acquired for a particular event in accordance with S100 in FIG. 26. Waveform 210 is the slope waveform constructed by joining the slopes of the samples in the sample sequence 200, obtained in accordance with S101 in FIG. 26. Further, point 220 indicates the peak of the waveform 210 before the occurrence of the recording condition, and point 230 indicates the peak of the waveform 210 after the occurrence of the recording condition.

FIG. 28 is a diagram showing one example of the peak master file.

As shown in FIG. 28, the ranges of values, i.e., the upper and lower limit values, that the peak values (see S102 in FIG. 26) of the G1 value, G2 value, and vehicle speed, respectively, can take before and after the occurrence of the recording condition, are defined for each of the five driving situations, and the driving situation is identified (S103 in FIG. 26) by determining within which of the upper/lower limit value ranges shown in FIG. 28 each peak value identified in S102 of FIG. 26 falls. In FIG. 28, hatched areas are the areas where the peaks are defined, and peak values are not defined in other areas.

In FIG. 27, suppose, for example, that the value at point 220 of the G1-value waveform 210 is 1.5 and the value at point 230 is −1.5; then, from the peak master file of FIG. 28, it can be determined that the driving situation corresponds to "hard braking."

Figure 29:
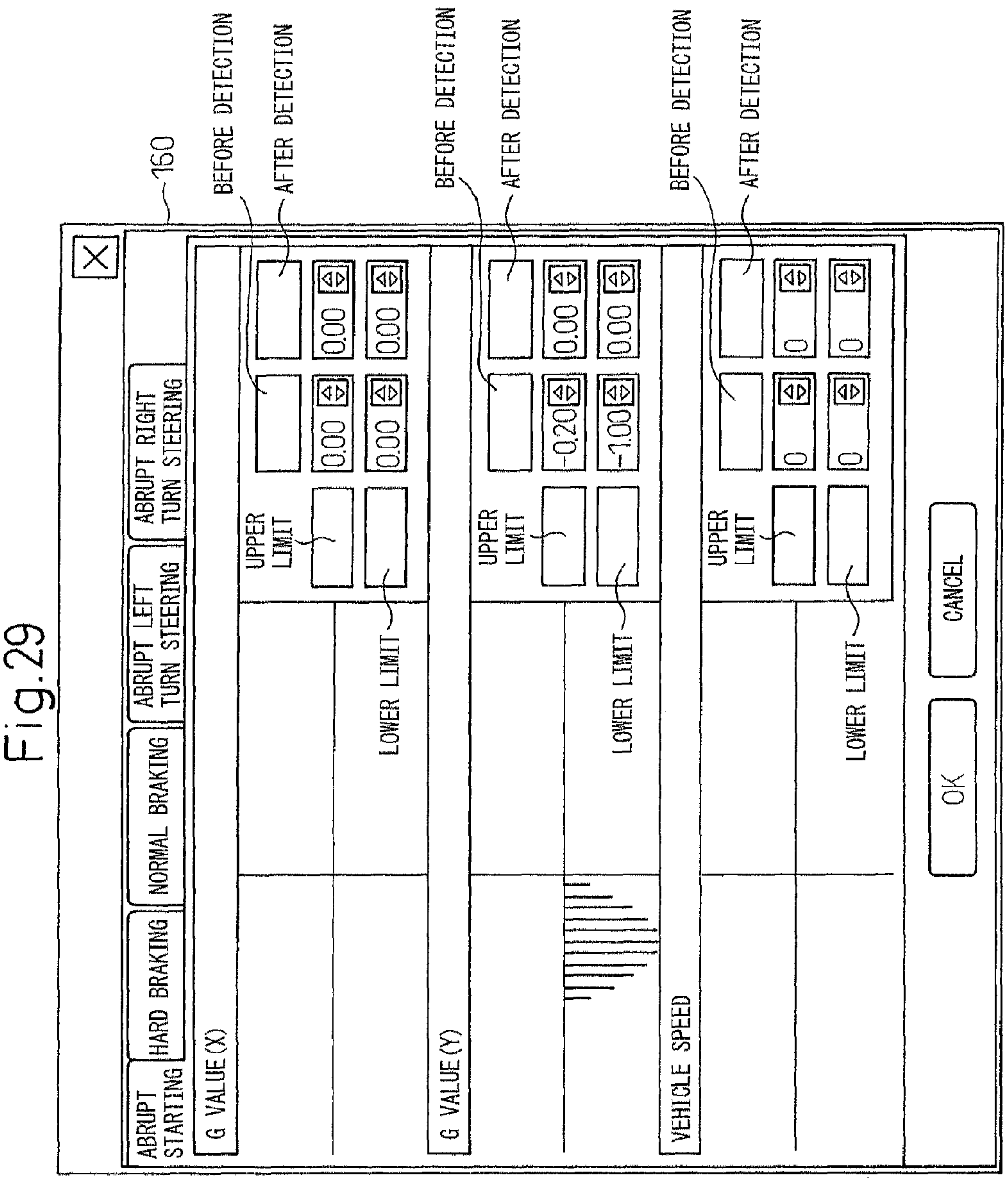
FIG. 29 is a diagram showing an example of an edit screen.

Here, it is preferable to make provisions so that the values defined in the peak master file of FIG. 28 can be corrected using the edit screen 160 displayed on the display unit 440 as shown in FIG. 29. The edit screen 160 shown in FIG. 29 is one for correcting the conditions concerning abrupt starting. The values defined in the peak master file of FIG. 28 are only examples, and other suitable values can be employed; further, vehicle speed can be added as a condition.

Figure 30A:
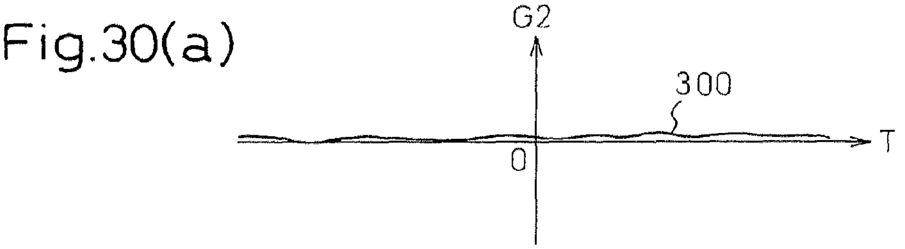
FIG. 30(*a*) is a diagram showing a G2-value sample sequence 300, FIG. 30(*b*) is a diagram showing a G1 -value sample sequence 301, and FIG. 30(*c*) is a diagram showing a vehicle-speed sample sequence 302.
Figure 30B:
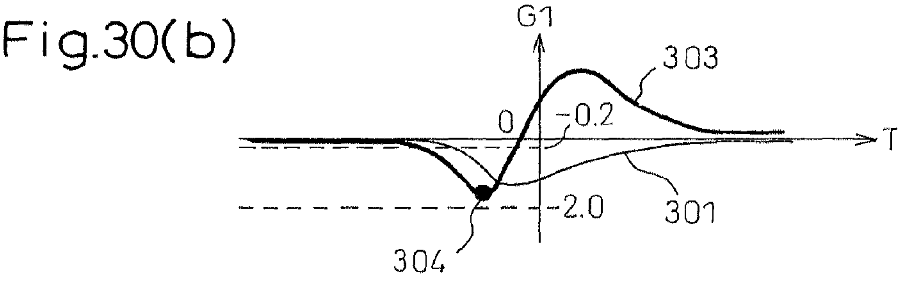
Figure 30C:
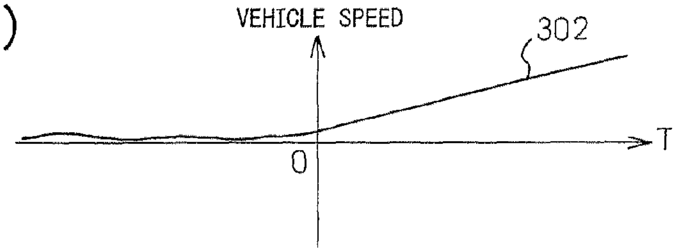

FIG. 30 is a diagram showing a typical pattern representing an abrupt starting situation.

FIG. 30(*a*) shows a G2-value sample sequence 300, FIG. 30(*b*) shows a G1-value sample sequence 301, and FIG. 30(*c*) shows a vehicle-speed sample sequence 302. In each diagram, T=0 represents the time at which the recording condition occurred.

From the G1-value, G2-value, and vehicle-speed sample sequences, the slope waveform of each sample is obtained, and the driving situation is identified based on the peak values before and after the occurrence of the recording condition. In the case of FIG. 30, the slope waveform 303 of each sample is obtained from the G1-value sample sequence 301, and since the peak value 304 before the occurrence of the recording condition falls within the range of −0.2 to −2.0, it is determined that the driving situation corresponds to abrupt starting.

Figure 31A:
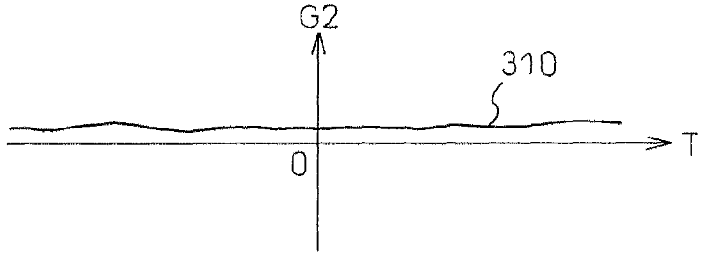
FIG. 31(*a*) is a diagram showing a G2-value sample sequence 310, FIG. 31(*b*) is a diagram showing a G1 -value sample sequence 311, and FIG. 31(*c*) is a diagram showing a vehicle-speed sample sequence 312.
Figure 31B:
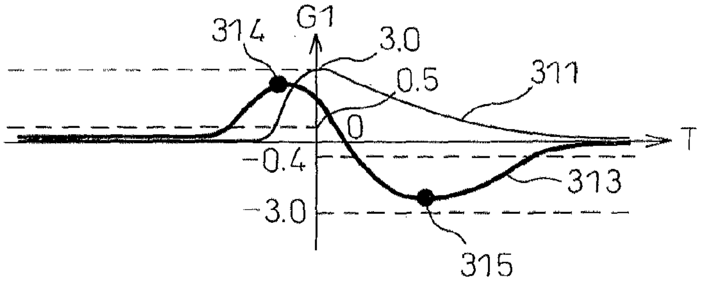
Figure 31C:
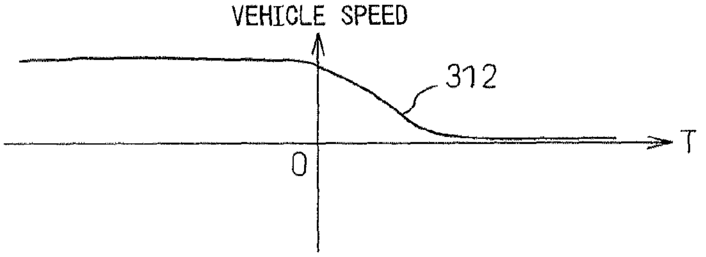

FIG. 31 is a diagram showing a typical pattern representing a hard braking situation.

FIG. 31(*a*) shows a G2-value sample sequence 310, FIG. 31(*b*) shows a G1-value sample sequence 311, and FIG. 31(*c*) shows a vehicle-speed sample sequence 312. In each diagram, T=0 represents the time at which the recording condition occurred.

From the G1-value, G2-value, and vehicle-speed sample sequences, the slope waveform of each sample is obtained, and the driving situation is identified based on the peak values before and after the occurrence of the recording condition. In the case of FIG. 31, the slope waveform 313 of each sample is obtained from the G1-value sample sequence 311, and since the peak value 314 before the occurrence of the recording condition falls within the range of 3.0 to 0.5, and the peak value 315 after the occurrence of the recording condition falls within the range of −0.4 to −3.0, it is determined that the driving situation corresponds to hard braking.

Figure 32A:
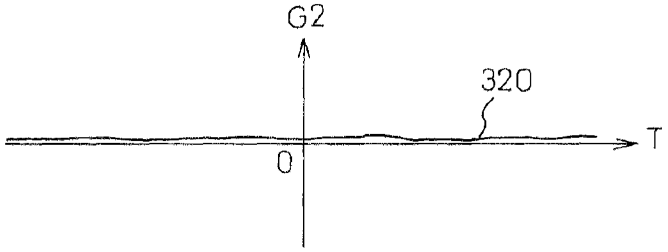
FIG. 32(*a*) is a diagram showing a G2-value sample sequence 320, FIG. 32(*b*) is a diagram showing a G1 -value sample sequence 321, and FIG. 32(*c*) is a diagram showing a vehicle-speed sample sequence 322.
Figure 32B:
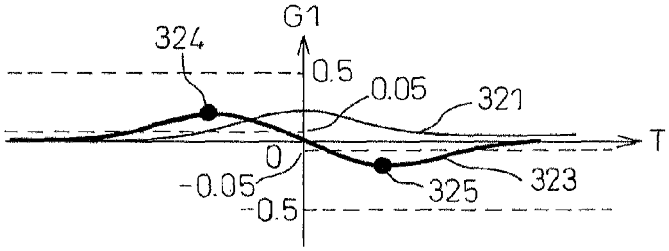
Figure 32C:
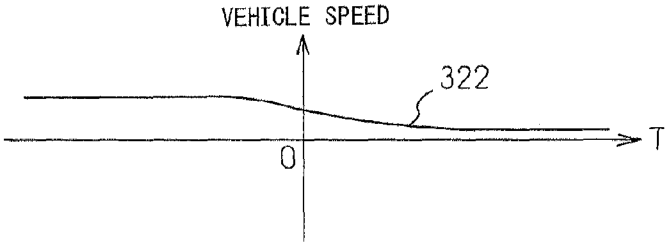

FIG. 32 is a diagram showing a typical pattern representing a normal braking situation.

FIG. 32(*a*) shows a G2-value sample sequence 320, FIG. 32(*b*) shows a G1-value sample sequence 321, and FIG. 32(*c*) shows a vehicle-speed sample sequence 322. In each diagram, T=0 represents the time at which the recording condition occurred.

From the G1-value, G2-value, and vehicle-speed sample sequences, the slope waveform of each sample is obtained, and the driving situation is identified based on the peak values before and after the occurrence of the recording condition. In the case of FIG. 32, the slope waveform 323 of each sample is obtained from the G1-value sample sequence 321, and since the peak value 324 before the occurrence of the recording condition falls within the range of 0.5 to 0.05, and the peak value 325 after the occurrence of the recording condition falls within the range of −0.05 to −0.5, it is determined that the driving situation corresponds to normal braking.

Figure 33A:
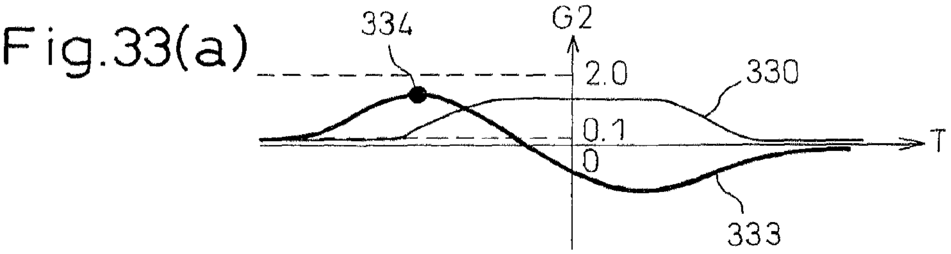
FIG. 33(*a*) is a diagram showing a G2-value sample sequence 330, FIG. 33(*b*) is a diagram showing a G1 -value sample sequence 331, and FIG. 33(*c*) is a diagram showing a vehicle-speed sample sequence 332.
Figure 33B:
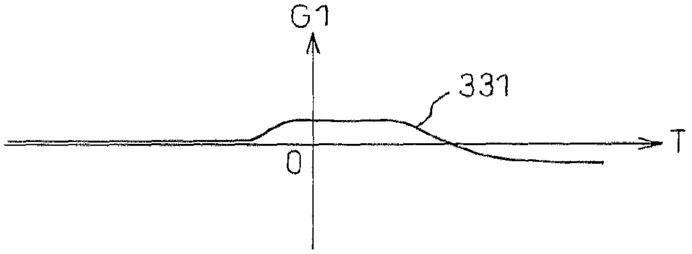
Figure 33C:
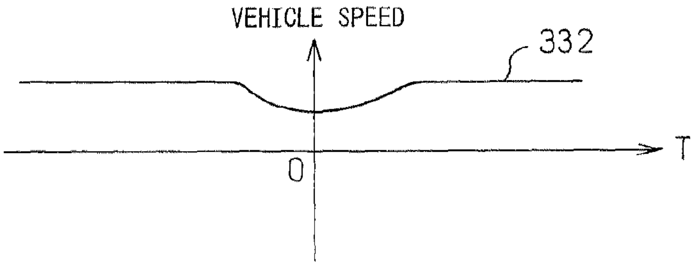

FIG. 33 is a diagram showing a typical pattern representing an abrupt left turn steering situation.

FIG. 33(*a*) shows a G2-value sample sequence 330, FIG. 33(*b*) shows a G1-value sample sequence 331, and FIG. 33(*c*) shows a vehicle-speed sample sequence 332. In each diagram, T=0 represents the time at which the recording condition occurred.

From the G1-value, G2-value, and vehicle-speed sample sequences, the slope waveform of each sample is obtained, and the driving situation is identified based on the peak values before and after the occurrence of the recording condition. In the case of FIG. 33, the slope waveform 333 of each sample is obtained from the G2-value sample sequence 330, and since the peak value 334 before the occurrence of the recording condition falls within the range of 2.0 to 0.1, it is determined that the driving situation corresponds to abrupt left turn steering.

Figure 34A:
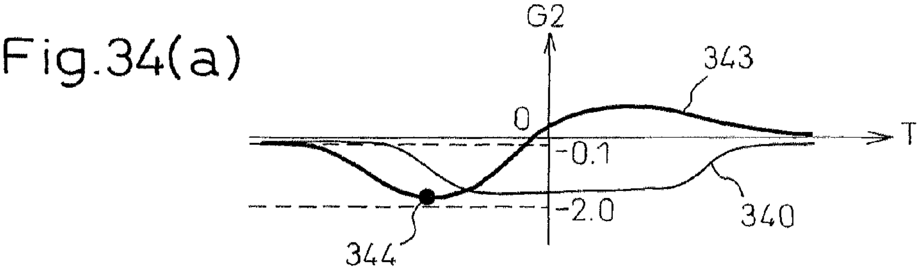
FIG. 34(*a*) is a diagram showing a G2-value sample sequence 340, FIG. 34(*b*) is a diagram showing a G1 -value sample sequence 341, and FIG. 34(*c*) is a diagram showing a vehicle-speed sample sequence 342.
Figure 34B:
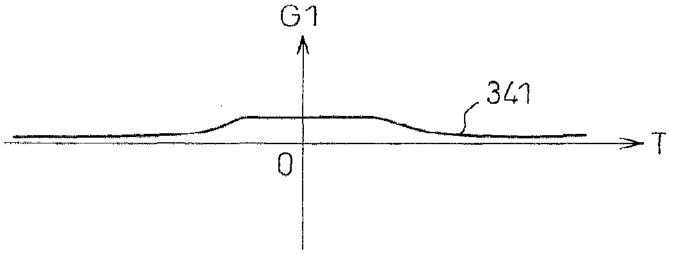
Figure 34C:
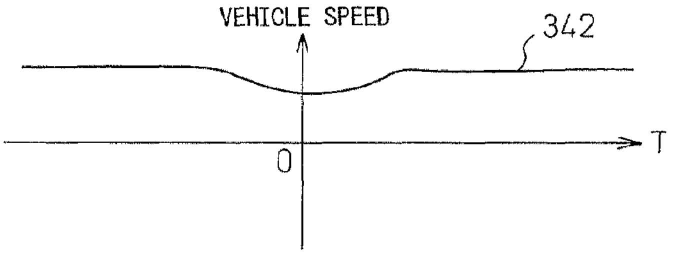

FIG. 34 is a diagram showing a typical pattern representing an abrupt right turn steering situation.

FIG. 34(*a*) shows a G2-value sample sequence 340, FIG. 34(*b*) shows a G1-value sample sequence 341, and FIG. 34(*c*)

shows a vehicle-speed sample sequence 342. In each diagram, T=0 represents the time at which the recording condition occurred.

From the G1-value, G2-value, and vehicle-speed sample sequences, the slope waveform of each sample is obtained, and the driving situation is identified based on the peak values before and after the occurrence of the recording condition. In the case of FIG. 34, the slope waveform 343 of each sample is obtained from the G2-value sample sequence 340, and since the peak value 344 before the occurrence of the recording condition falls within the range of −0.1 to −2.0, it is determined that the driving situation corresponds to abrupt right turn steering.

Since the driving situation that triggered the recording of the video information, etc., can be identified for each event as described above, it is possible to analyze the data in a more quantitative manner on the playback apparatus 400.

What is claimed is:

1. A drive recorder for recording video information received from an image capturing unit on a recording medium, comprising:

an acceleration sensor which outputs acceleration information representing acceleration applied to a vehicle; and a control unit configured to determine an occurrence of a recording condition and record video information captured for a first predetermined period of time before the occurrence of said recording condition, and record video information captured for a second predetermined period of time after the occurrence of said recording condition, on said recording medium when said acceleration information equals or exceeds a threshold, wherein after the occurrence of said recording condition, said control unit does not record newly captured video information on said recording medium when said acceleration information again becomes equal to or exceeds said threshold in less than a third predetermined period of time, which is shorter than said second predetermined period of time, and wherein after the occurrence of said recording condition, said control unit extends the length of time to record said video information on said recording medium when said acceleration information again becomes equal to or exceeds said threshold within a period of time not shorter than said third predetermined period of time but shorter than said second predetermined period of time.

2. The drive recorder according to claim 1, wherein when the length of time to record said video information on said recording medium is extended, said control unit does not records newly captured video information on said recording medium when said acceleration information again becomes equal to or exceeds said threshold during said extended time.

3. The drive recorder according to claim 1, wherein when the length of time to record said video information on said recording medium is extended, said control unit does not further extend the length of time to record said video information on said recording medium when said acceleration information again becomes equal to or exceeds said threshold during said extended time.

* * * * *